United States Patent [19]

Gu

[11] Patent Number: 5,874,988
[45] Date of Patent: Feb. 23, 1999

[54] SYSTEM AND METHODS FOR AUTOMATED COLOR CORRECTION

[75] Inventor: Xueming Henry Gu, Ft. Lauderdale, Fla.

[73] Assignee: Da Vinci Systems, Inc., Ft. Lauderdale, Fla.

[21] Appl. No.: 677,663

[22] Filed: Jul. 8, 1996

[51] Int. Cl.⁶ .................................................. H04N 3/36
[52] U.S. Cl. ........................................... 348/97; 382/167
[58] Field of Search .................................. 348/229, 649, 348/650, 651, 671, 672, 673, 674, 677, 680, 722, 575, 222, 223, 97, 241, 577; 213/34, 97, 179, 364; 345/431; 382/167, 168, 170, 224, 273, 274, 162; 358/500, 501, 518, 519, 520, 522, 523, 524, 530, 531; 364/943; H04N 9/64, 5/14

[56] References Cited

U.S. PATENT DOCUMENTS

| | | |
|---|---|---|
| 4,500,919 | 2/1985 | Schreiber . |
| 4,525,736 | 6/1985 | Korman . |
| 4,642,682 | 2/1987 | Orsburn et al. . |
| 4,727,412 | 2/1988 | Fearing et al. . |
| 4,763,186 | 8/1988 | Belmares-Sarabia et al. . |
| 4,811,084 | 3/1989 | Belmares-Sarabia et al. . |
| 4,862,251 | 8/1989 | Belmares-Sarabia et al. . |
| 4,876,589 | 10/1989 | Orsburn et al. . |
| 4,908,874 | 3/1990 | Gabriel . |
| 4,952,051 | 8/1990 | Lovell et al. . |
| 5,050,984 | 9/1991 | Geshwind . |
| 5,051,928 | 9/1991 | Gruters . |
| 5,212,546 | 5/1993 | Arazi et al. ............................... 358/80 |
| 5,252,953 | 10/1993 | Sandrew et al. . |
| 5,253,043 | 10/1993 | Gibson . |
| 5,327,501 | 7/1994 | Kato et al. . |
| 5,412,773 | 5/1995 | Carlucci et al. ......................... 395/156 |
| 5,450,500 | 9/1995 | Brett . |
| 5,495,540 | 2/1996 | Frankot et al. . |
| 5,506,946 | 4/1996 | Bar et al. . |
| 5,506,949 | 4/1996 | Perrin . |
| 5,530,774 | 6/1996 | Fogel . |
| 5,694,484 | 12/1997 | Cottrell et al. .......................... 382/167 |

*Primary Examiner*—Andrew I. Faile
*Assistant Examiner*—Ronald D. House
*Attorney, Agent, or Firm*—Jones & Askew, LLP

[57] ABSTRACT

A system and methods for automated color correction. A computer-based workstation is coupled to an image source such as a telecine or other graphic image generating device, an image processing system such as a color corrector, and a utilization device such as a tape recorder or digital storage device. A target image from the image source is displayed on a display monitor associated with the workstation. An image and data storage device stores images and prestored reference image information for a plurality of selectable reference images. A capture device captures a source image from the image source. An image analyzer software process computes statistical parameters of the source image and compares these statistical parameters to prestored statistical parameters of a selected one of the reference images. The statistical parameters include a color distribution or frequency histogram for various color parameters, e.g. gain, gamma, and black level for video signals. A control unit provides correction value outputs to the image source or to the image processing system, to control the color parameters. The correction value outputs are utilized to control image parameters of the source image in an iterative manner until there is a match between prestored statistical parameters of the reference image and the determined statistical parameters of the target image.

54 Claims, 12 Drawing Sheets

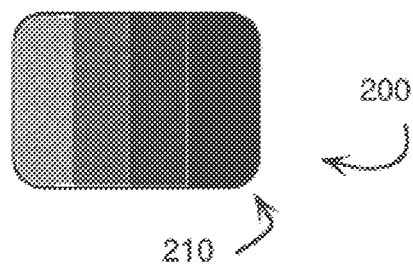
FIG. 2A
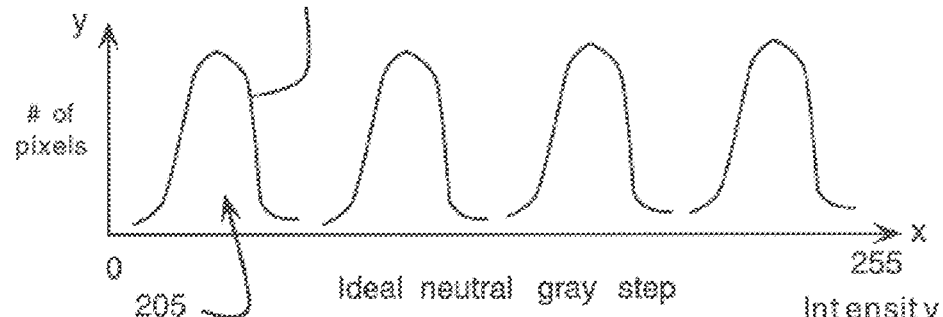
FIG. 2B
FIG. 2C
FIG. 2D

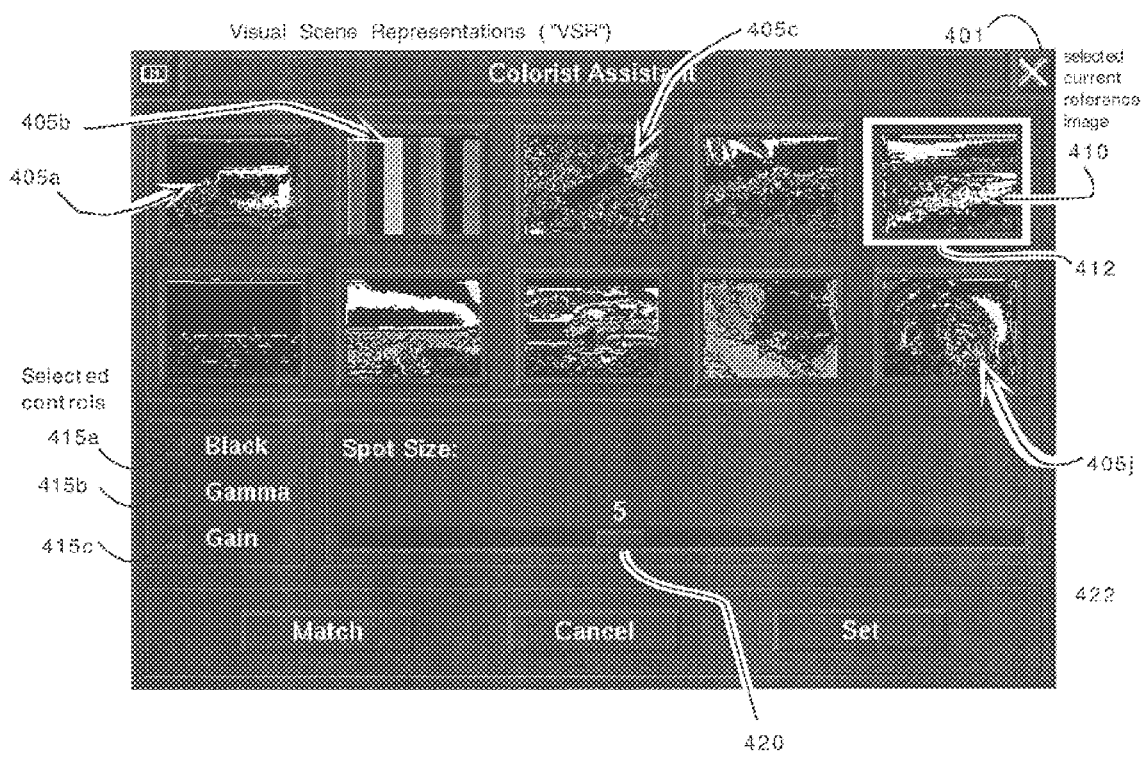
FIG. 4   Colorist Assistant (Main) Screen

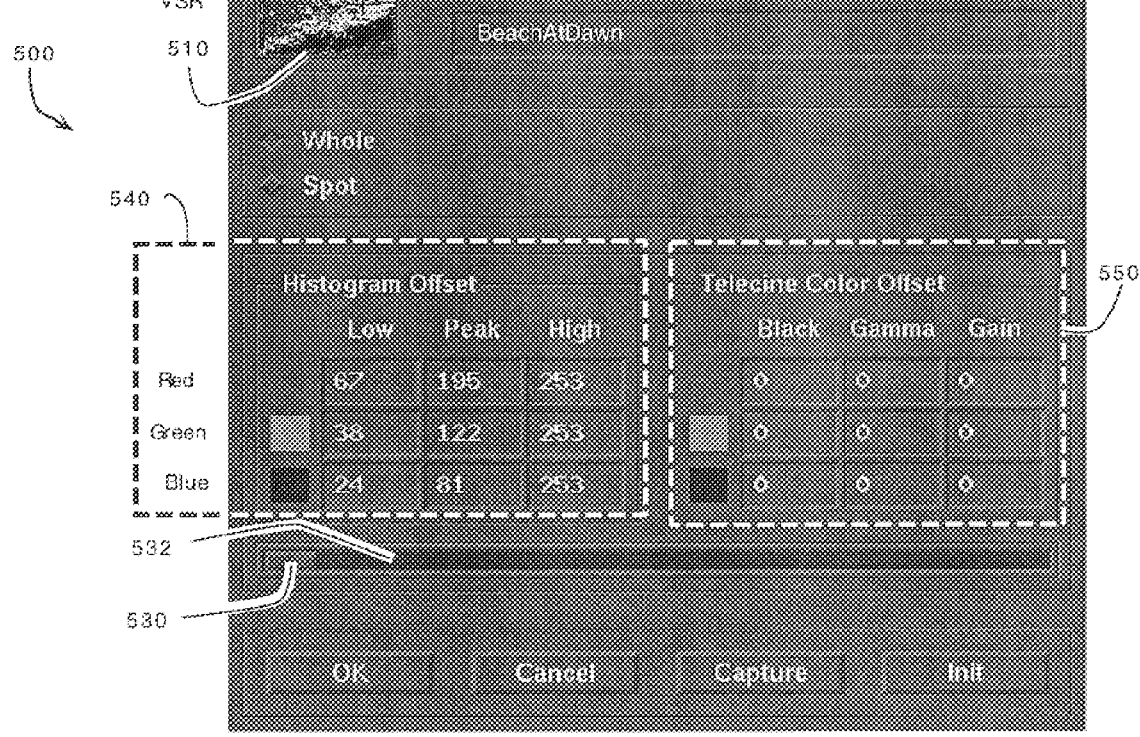

Set process

Match process high gain

If high edge of
image is higher
than reference,
system will reduce
gain control parameter stretched out    250 high edge Reference
histogram 30 lower edge    160 peak    230 high edge low gain If high edge of
image is lower
than ref, system
will increase gain
control parameter 180 high edge high gamma stretched    compressed
peak shifted right to 170

Reference
histogram 30           160    230
lower        peak   lower
edge                edge low gamma compressed    stretched
peak shifted left to 130 high black

Reference histogram low black

FIG. 12
Data Structure

| Field | Type | Description |
|---|---|---|
| Name | text | text to describe a reference |
| Spot Flag | flag | indicates that reference is used for spot (local area) comparison or whole image comparison |
| Spot Red Color | number | Level of red signal which user selected for defined area |
| Spot Green Color | number | Level of green signal which user selected for defined area |
| Spot Blue Color | number | Level of blue signal which user selected for defined area |
| Low Red | number | lower edge of red histogram |
| High Red | number | upper edge of red histogram |
| Peak Red | number | peak of red histogram |
| Low Green | number | lower edge of green histogram |
| High Green | number | upper edge of green histogram |
| Peak Green | number | peak of green histogram |
| Low Blue | number | lower edge of blue histogram |
| High Blue | number | upper edge of blue histogram |
| Peak Blue | number | peak of blue histogram |
| Medium Red Center | number | center of mass for red histogram |
| Medium Green Center | number | center of mass for green histogram |
| Medium Blue Center | number | center of mass for blue histogram |
| Low Red Center | number | center of mass for red histogram |
| Low Green Center | number | center of mass for green histogram |
| Low Blue Center | number | center of mass for blue histogram |
| High Red Center | number | center of mass for red histogram |
| High Green Center | number | center of mass for green histogram |
| High Blue Center | number | center of mass for blue histogram |
| Imagedata | data | data for image display |

SYSTEM AND METHODS FOR AUTOMATED COLOR CORRECTION

TECHNICAL FIELD

The present invention relates generally to processing of color image signals, and in particular, relates to an improved system and methods for the automated correction of color video signals. It is particularly useful in digital systems for color correction and modification.

BACKGROUND OF THE INVENTION

Color correction and modification has been in widespread use in connection with television advertisements and various aspects of film to tape transfer including preservation and restoration of color prints of deteriorating film media. Very sophisticated apparatus for selecting signal levels representing particular hues, and combinations of hue and saturation, in video signals have been developed. For example, color correcting apparatus is shown in U.S. Pat. Nos. 4,642,632; 4,727,412; 4,876,589; and 5,253,043.

Color correction and modification is used in a number of applications within the television industry and other businesses which make use of video and other graphic image signals. A principal use is in film to tape transfers and postproduction processing of commercials to highlight certain objects, colors, and the like. For example, when it is desired to emphasize a particular object in a scene or image, wherein the object has a detectable hue that is distinguishable from the hues of other objects in the scene (e.g. a spot color), the occurrence of picture elements ("pixels") containing this hue can be detected and the saturation level can be increased. In conventional color correctors, this has the effect of "highlighting" the particular object. For example, the hue distinctive to a red soft drink can in an advertisement can be saturated so as to draw additional attention of the viewer to the can.

For video equipment, a color correction system operator must typically go through a two-stage process when importing video images for color correction utilizing conventional color correction equipment. The first step typically involves adjusting controls at the video image source, for example, a telecine, so as to provide a wide dynamic range. The second step involves adjusting controls with the color correction equipment on a scene by scene basis.

In the first step, it is important to set up the video image source to provide a wide dynamic range of signal levels prior to their input at the color correction equipment. For example, if the video signals input have a dynamic range from 0–65,535 values (indicating 16 bits of digitization), but the predominant area of interest of a picture is concentrated within a range of, say, about 5,000 to about 30,000, then the operator would wish to scale the video signals from the image source so that the 5,000–30,000 range expands to fit the available dynamic range of the color correction equipment. The operator employs controls at the video image source equipment, e.g., gain, gamma, and black level, to scale the information to the dynamic range of the color corrector.

During this set up process, a color correction operator will often look at a vectorscope or waveform monitor to observe the effects of adjusting the controls at the image source. The operator typically must run a series of frames of source image while observing the vectorscope or waveform monitor, make adjustments, and then rerun the selected scene until satisfied that the signals representing the pictures have been scaled properly to fit the dynamic range of the color correction equipment.

With telecine type video image source equipment, adjustments are typically made by manually adjusting telecine photoelectric cells or the color controls GAIN, BLACK, and GAMMA for each of the red, green, and blue video channels to obtain the suitable dynamic range in overall signal level during set up. Then, the correction operator must adjust the color correction equipment controls, and sometimes the telecine's controls, to achieve a desired color balance on a scene by scene basis.

Even if a desired color balance is fixed, such as for neutral gray, flesh tones, etc., which are restricted to a narrow range of acceptable values, for many scenes the operator must manually and repetitively adjust each control until the appropriate color balance is achieved. These adjustments require a lot of repetitive, tedious work, both at the color correction equipment and sometimes to the image source equipment.

The need for the present invention occurred to the inventor during observation of the process of set up for the first stage of color correction. If a system could be devised to employ a computer or workstation to adjust video signal parameters, e.g. GAIN, BLACK and GAMMA, for each of the three color channels, the overall color correction process could be made more efficient.

Those skilled in the art will understand that adjustment parameters for the three primary color video signals red (R), green (G), and blue (B) are typically those of GAIN, GAMMA, and BLACK. Intuitively, GAIN is a factor that controls the overall amplification of the signal, and is most often associated with setting the peak amplitude. The BLACK level, on the other hand, is most often associated with the signal levels at the lower end of the scale, with nominal values (e.g. $16_{10}$) for each of R, G and B indicating minimal signal level and a completely black screen. Raising R, G, and B equally for low signal levels brings up the overall "BLACK" level in terms of shades of gray.

The GAMMA parameter, which originated in photography, relates to non-linear characteristics in the mid-range portion between the lowest signal levels and highest signal levels, and allows introduction of an approximation of the non-linear response characteristics of the human eye to light intensity levels. GAMMA correction intuitively has the effect of compressing or spreading out signal intensities in the middle range of intensity values perceptible by the human eye viewing a video screen. The GAMMA level of a video image is often associated with the most predominant signal level of a given picture, which can be measured by determining the signal level associated with the greatest number of pixels in the picture. frequency distribution. This is often referred to as the "peak" value, since a frequency distribution (histogram) of signal level vs. number of pixels will have a peak at this particular signal level.

Those skilled in the art will also understand that other video parameters and signal standards are commonly encountered in color correction equipment. The standard NTSC video signal represents color information in terms of hue, saturation, and luminance. Yet other types of video equipment provide color difference signals R-Y, B-Y, G-Y, where Y is a luminance signal determined from a matrix of R, G and B with weighted RGB values. As is well known to those skilled in the art, the NTSC standard broadcast television signal was adopted in the United States in 1941 and popularized shortly after World War II. In 1953, the current NTSC standard for color television broadcasting including a 3.58 MHz subcarrier carrying the chroma information, which composite signal was compatible with NTSC monochrome receivers, was adopted. Since continental Europe was recovering from the effects of World War II, it was somewhat later in adopting standard television signals. Most of Europe adopted a standard Phase Alteration by Line (PAL) composite broadcast signal with better resolution than that of the NTSC format. The French and certain others adopted a color system known as SECAM.

In recent years, attention of the television industries throughout the world has been turned to various proposals and apparatus for providing high definition television (HDTV) with both digital and analog composite signal methods. Many of the current processing techniques for video signal correction are carried out in the digital domain. In order to promote the international interchange of video signals and to standardize the interface between digital video signal sources and devices utilizing or transmitting same, the International Radio Consultant Committee (CCIR) promulgated Recommendation No. 601-1 in 1986 which defines a standard set of digitized color signals for television studios. CCIR Recommendation 601-1 (1986) is hereby incorporated by reference.

It is within the scope of the prior art to take CCIR 601-1 digitized signal streams, convert same to corresponding RGB signals (in analog or digital domains), and then to perform the primary and secondary color corrections and modifications on the resultant signals. The corrected or modified signal can then be passed through a signal matrix and reconverted to a digital bit stream through use of an analog to digital converter. The standard signals defined in Recommendation 601-1 essentially consist of a luminance signal Y and two color difference signals (R-Y) and (B-Y). It is well known that, since the luminance signal contains information on levels of red, green and blue (RGB), the three standard signals can be used to reproduce the RGB levels for any given set of samples.

The need for the present invention occurs not only in equipment for analog video signal processing, but also in equipment for HDTV video signal processing, digital video signal processing, postproduction color correction equipment, and broadcast television. Moreover, there is need for the invention in other color graphics/image processing technologies such as graphics generating devices and displays, print media, digital photography, etc.

SUMMARY OF THE INVENTION

Briefly described, the present invention provides a system and methods for automated color correction. The system is preferably built around a computer-based workstation coupled to an image source such as a telecine or graphics generating or input device, an image processing system such as a color corrector, and a utilization device such as a tape recorder, digital storage device, or display. A source image for correction can be provided to the system by a telecine, a television camera, video tape playback equipment, video signal digitizer, a digital video signal providing device, or other graphic image generating or inputting device such as a scanner or camera. The utilization device can be an image processing system, a color corrector, a parameter controllable image source, an image destination or storage device.

In operation, a target image from the image source is displayed on a display monitor associated with the workstation. The preferred system includes an image capture device for capturing a source image from the image source, an image and data storage device for storing images and prestored reference image information, an image analyzer that computes statistical parameters of the source image and compares these statistical parameters to prestored statistical parameters of a plurality of reference images, and a control unit that provides correction value outputs to the image source or to the image processing system. The correction value outputs are utilized to control color parameters of the source image in an iterative manner until there is a match between prestored statistical parameters of the reference image and the determined statistical parameters of the target image.

Other aspects of the invention involve methods for automated color correction carried out in the disclosed system. Predetermined color parameter statistical data, e.g. the lower edge, upper edge, and peak values of color distribution histograms for a plurality of selectable reference images, are stored in a reference image memory device. An operator selects a particular one of the selectable reference images by clicking on a reference image icon on a control screen. The predetermined color parameter statistical data associated with the selected reference image are retrieved from the reference image memory device. Signals associated with a source image are received from the image source. The source image signals are captured with the capture device in the source image memory device. Color parameter statistical data associated with the captured source image are then determined. The predetermined color parameter statistical data of the selected reference image are compared with the determined color parameter statistical data of the source image. In response to the comparison indicating a difference between the predetermined color parameter statistical data of the reference image and the determined color parameter statistical data of the source image, a control signal output is provided to a utilization device.

The predetermined color parameter statistical data is stored for each of the red, green, and blue video channels. The predetermined color parameter statistical data can be any of various types of statistical parameters. In the disclosed embodiment, a color distribution in the form of a frequency distribution is employed, and the statistical data utilized comprises the highest value, the lowest value, and the peak value of the video signal in each of the color channels. The predetermined color parameter statistical data can also be determined and stored for the parameters of hue, saturation, and luminance.

Preferably, a histogram associated with the captured source image is displayed after the step of determining the color parameter statistical data associated with the captured source image. This allows the operator to visually compare the parameters of the source image to corresponding parameters of a selected reference image. The data corresponding to the determined statistical parameter of the source image is preferably displayed on display monitor associated with the workstation.

According to another aspect of the invention, a plurality of selectable icons or "visual scene representations" (VSRs) representing the plurality of selectable reference images are displayed on the workstation display monitor. The operator can select one of the selectable reference images by clicking on one of the displayed selectable icons with an input device.

According to yet another aspect of the invention, the control signal is utilized adjust a color parameter at the image source or at the image processing system. The steps of receiving color image signals, capturing the source image, determining the color parameter statistical data associated with the captured source image, comparing the predetermined color parameter statistical data associated with the selected reference image with the determined color parameter statistical data of the source image, and providing the control signal output are iteratively repeated until the difference between the predetermined color parameter statistical data of the selected reference image and the determined color parameter statistical data of the source image is less than a predetermined amount. In this manner, the color image signals associated with the source image are automatically adjusted.

According to still another aspect of the invention, there is provided a method for the automated correction of color signal parameters involving the display of a control screen on a display monitor comprising a plurality of selectable icons, each selectable icon representing one of a plurality of selectable reference images. Color parameter statistical data associated with each of the selectable reference images is stored in a memory. A match control is displayed on the control screen.

In response to operator actuation of the match control, the source image signals are captured with a capture device in a source image memory device. Color parameter statistical data associated with the captured source image are determined. The predetermined color parameter statistical data of the selected reference image are compared with the determined color parameter statistical data of the source image. In response to the comparison step indicating a difference between the predetermined color parameter statistical data of the reference image and the determined color parameter statistical data of the source image, providing a control signal output to a utilization device. The steps of capturing, determining, comparing, and providing a control signal output are repeated until a predetermined terminating event, such as a predetermined number of iterations or clicking on a cancel button.

Yet another aspect of the invention involves a method for capturing reference information associated with an image produced by an image source. The method comprises displaying an image produced by the image source on a display monitor, and a first control screen comprising a plurality of selectable visual scene representation (VSR) icons. Each selectable VSR icon represents one of a plurality of selectable reference images for which captured reference information is available. In response to first user command, a second control screen on the display monitor including a visual scene representation (VSR) region is displayed. In response to a second user command, a visual scene representation of the image displayed on the display monitor is captured and displayed in the VSR region of the second control screen. In response to a third user command, color parameter statistical data associated with the image represented by the captured VSR is determined. The captured VSR and its associated color parameter statistical data are stored in a memory device as reference information for use by other disclosed methods. The captured VSR are displayed on the first control screen as one of the plurality of selectable VSR icons.

Accordingly, it is an object of the present invention to provide methods and systems for automated color correction.

It is another object of the present invention to provide a system that allows a color correction operator to set up a telecine for postproduction operation automatically.

It is another object of the present invention to provide a system for automated color correction that provides a number of visual scene representations for prestored image data, to allow an operator to quickly select a prestored reference image for matching to a color image provided by an image source.

It is another object of the present invention to provide a system for the quick selection of a spot color region in a target image, and automated matching of the color characteristics of the spot color in the target image to a prestored spot color.

It is yet another object of the invention to provide an automated system for adjusting controls at an image source, for example, a telecine, so as to provide a wide dynamic range for subsequent color correction equipment.

It is another object of the present invention to provide a system for automated color balance and matching for neutral gray, flesh tones, and spot colors which are restricted to a narrow range of acceptable values, so as to relieve a color correction operator from manually and repetitively adjusting controls at the color correction equipment and sometimes at the image source equipment until the appropriate color balance is achieved.

These and other objects, features, and advantages of the present invention may be more clearly understood and appreciated from a review of the following detailed description of the disclosed embodiment and by reference to the appended drawings and claims.

BRIEF DESCRIPTION OF THE DRAWINGS

FIG. 2, consisting of FIGS. 2A, 2B, 2C, and 2D, illustrates an exemplary color distribution in the form of a frequency distribution or histogram for a gray scale test image.

FIG. 4 illustrates an exemplary main or Colorist Assistant user interface screen displayed in the preferred embodiment of the present invention.

FIG. 5 illustrates an exemplary Set Reference Screen displayed in the preferred embodiment of the present invention.

FIG. 12 is a table illustrating the data structure employed to store information in the preferred embodiment of the present invention.

DETAILED DESCRIPTION OF THE PREFERRED EMBODIMENT

Figure 1:
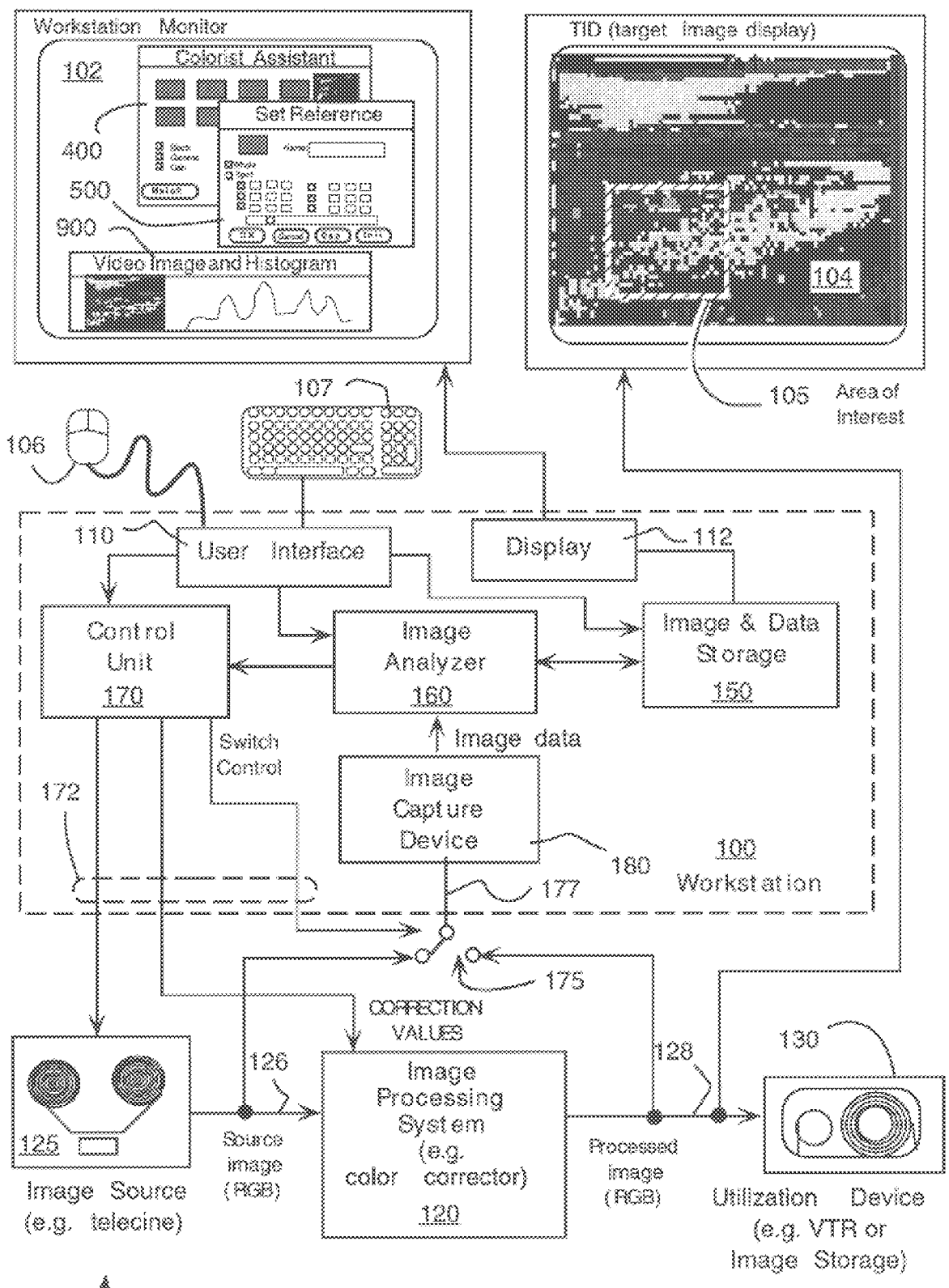
FIG. 1 is a block diagram of a color correction or modification system constructed in accordance with the preferred embodiment of the present invention.

Turning now to the drawing figures, in which like numerals represent like parts, the preferred embodiment of the present invention will now be described. FIG. 1 shows a block diagram of the preferred embodiment of the present invention constructed as a system 10 in which the methods of the present invention are carried out. A preferred embodiment of the present invention is constructed utilizing a computer-based workstation 100, to which is connected one or more display devices such as a workstation monitor 102 and/or a digital monitor 104. A pointing device such as a mouse 106 and a data entry device such as a keyboard 107 are connected to user interface circuitry 110 associated with the workstation 100 in the known manner.

The workstation is coupled to an image processing system 120, an image source 125, and a utilization device 130, as will be described in more detail. The image source 125 can be a telecine, a scanner, a video tape recorder, a digital storage device storing digitized video signals, a television camera, a graphics generating device, and other devices. The image source 125 can be any type of equipment or apparatus that generates images.

The image processing system 120 can be a color correction system, an image enhancement device, special effects processor, noise reducers, and the like.

Likewise, the image utilization device 130 can be a video tape recorder, a video signal digitizer, a digital storage device for storing digitized video signals or other formats of images, a video display monitor, or any other device that utilizes graphical color image signals. The image utilization device 130 can be any type of equipment or apparatus that stores, processes, projects, displays, transmits, or otherwise utilizes graphical images.

Although the preferred embodiment is described in terms of video signal processing, it will be appreciated that it is equally useful in any application involving graphical color images of any dimension.

The image source 125 such as a telecine provides input signals for operation in the system, preferably in a CCIR Recommendation 601-1 format. As is known to those skilled in the art, a standard 601-1 type data source provides samples of at least eight bits each of a luminance signal, and two color difference signals (R-Y) and (BY). The luminance signal Y is sampled at 13.5 MHz and each of the color difference signals is sampled at one half that rate, 6.75 MHz. A source image is provided on line 126, which in practice is broken out as three individual lines, each of which carries one of the algebraic combination signals defined by the Standard from the image source.

The preferred embodiment of the present invention was created in connection with a system for color correction and modification as part of a film-to-tape transfer process. Therefore, a telecine is the described source 125 of the digitized video signals. However, it should be understood that a number of other devices, such as tape decks, video disk players, and paint boxes are known which produce similar sets of digitized image signals and that such devices may be used in embodiments of the present invention. Moreover, the image source may provide analog video signals, and such signals may be digitized by analog to digital conversion equipment (not shown) prior to manipulation by the workstation 100.

Strictly speaking, Recommendation 601-1 provides for time division multiplexing of the three algebraic combination signals in the pattern Y, (R-Y), Y, (B-Y), Y. . . In this disclosure, the line 126 represents a breakout of these signals by demultiplexing the time slots to provide individual sequences of sampled signals. It should be understood that the use of standard 4:2:2 Y, (R-Y), (B-Y) signals is a feature of the preferred embodiment and is not, per se, limitation on the scope of the present invention. It will be apparent from the following description that embodiments of the invention for processing 4:4:4 RGB signal sequences can be produced by elementary modifications to the apparatus and methods constituting the preferred embodiment.

The digital video signals on line 126 are provided to the image processing system 120, which in the disclosed embodiment is a primary and secondary color corrector. The color corrector 120 generally represents any apparatus, preferably digital, which can process video signals to analyze and modify GAIN, GAMMA, BLACK, HUE, SATURATION, LUMINANCE, or any other parameter of a video signal. One particular device contemplated for the image processing system 120 is the DaVinci RENAISSANCE 8:8:8™ Color Corrector manufactured by the assignee of the present invention. Details of the preferred RENAISSANCE 8:8:8™ Color Corrector are available in the literature supplied by the manufacturer. Any device which will analyze and modify hues, saturation, gamma characteristics, or any other parameter of a video signal may embody the image processing system 120 in embodiments of the present invention.

The preferred RENAISSANCE 8:8:8™ color corrector operates on the samples at a 27 MHz sampling rate. Three corresponding output lines, collectively shown as 128, carry sequences of processed signals for the luminance value Y and the (B-Y) and (R-Y) color difference signals, respectively, or alternatively RGB in 4:4:4 format These processed signals are provided to a connector of a utilization device 130. It should be understood that utilization device 130 can be any apparatus which can make use of the processed output video signals. In the preferred embodiment illustrated in FIG. 1, utilization device 130 includes digital storage devices, digital-to-analog converters for Recommendation 601-1 signals, a video tape recorder, and other graphic image utilization devices or apparatus.

Still referring to FIG. 1, the preferred workstation 100 is an INDY™ model workstation manufactured by Silicon Graphics, Inc. (SGI). The preferred workstation includes an R4600 RISC processor operating in excess of 133 MHz, internal 24-bit XL color graphics (with RGB single or double buffer color indexes), a digital video input port capable of storing 640×480×30 fps to memory, 2 serial and 1 parallel data port, an Ethernet network port, a fast SCSI-2 data port, at least 32 megabytes of RAM, and a 1.0 or larger Gb hard disk. Optionally, a different SGI model workstation could be employed, e.g. one including a video adapter card that allows support and use of multiple monitors. Further details of the preferred workstation are available in the literature supplied by the manufacturer.

The preferred workstation 100 includes on-board display driver circuit 112, namely, the 24-bit XL color graphics circuitry with RGB double buffer color indexes) which provides video signals to at least one workstation monitor 102. A separate, second video monitor 104 is utilized in the preferred embodiment to display a target image on a "target image display" (TID), that is, an full screen representation of the video image being processed in the system. If a workstation model is employed that supports multiple monitors, the second monitor or TID 104 may be connected to the workstation 100.

Although FIG. 1 shows a single monitor 102 attached to the display driver circuitry 112, it will be understood that this architecture is just one possible arrangement for displaying the information associated with operation of the present invention to an operator and displaying an image on which the present invention is operative. In the preferred embodiment, there are two separate monitors, a first monitor 102 for displaying the user interface screens associated with operation of a computer program for carrying out the methods and processes of the present invention, and a second monitor or TID 104 for displaying the image to be manipulated. The second monitor 104 is directly connected to the output of the image processing system 120 so as to permit the operator to directly view the operations of the system. In this manner, an operator can concentrate on the informational displays and controls at the workstation monitor 102, and can view the results of the color correction operations in high resolution on the second monitor 104.

Alternatively, a single monitor can be utilized to display the informational displays and controls as well as the TID, in separate windows that can be resized and repositioned as is customary in modem day computer user interfaces.

Yet another alternative is to provide a separate target image display 104 connected to a video adapter board associated with the workstation 100, in a "dual monitor" approach.

The preferred configuration allows generation and display of a "spot" or predetermined region 105 on the second monitor 104 for selection of a particular color region. Moreover, by switching the image processing system 120 into a "bypass" mode via a control signals from the workstation 100, the image source output can be passed unprocessed to the output on line 128, and in this manner the TID 104 can display the image source output. Those skilled in the art will understand and appreciate that other architectures or arrangements are possible and considered equivalent.

The workstation 100 includes several components that are shown in functional form in FIG. 1. The user interface circuitry 110 detects commands and data provided by the operator and converts them into signals usable by the workstation's central processing unit (CPU). An image and data storage device 150 is provided for storing digitized video images, the display memory for the workstation monitor 102 (and second video monitor 104 if so configured), random access memory (RAM) for storing programs and data, and preferably a hard disk or other mass data storage device.

An image analyzer 160 is central to the operation of the preferred embodiment of the present invention. The image analyzer block 160 represents the basic computational function provided in the present invention that is operative to analyze a selected image and calculate a color frequency distribution of the image in the manner as will be described. As previously described, these color distributions include, but are not limited to, a histogram in RGB or other color space, a hue/saturation (vectorspace) distribution, samples of color levels in a group of pre-defined areas, etc. Although the image analyzer 160 is shown as a functional block, those skilled in the art will understand after a discussion which follows that the function is predominantly a software process carried out within the workstation.

A control unit 170 is shown coupled to the user interface 110, the image analyzer 160, a selector switch 175, the image processing system 120, and the image source 125. The control unit in the preferred embodiment is primarily a collection of control signals provided as outputs shown collectively at 172 from the workstation 100 that are employed to control functions within the image source 125 or within the image processing system 120. These control signals include signals to switch the image processing system into the bypass mode, color correction signals, and other controls associated with controlling and operating the image processing signal.

The selector switch 175 allows selection between a source image provided by the image source 125 and a processed image provided as an output of the image processing system 120. The selector switch 175 is coupled to a data input port 177 associated with the workstation 100, and is controlled by a control signal on one of the lines 172 from the control unit 170.

The control 170 unit also provides signals denominated CORRECTION VALUE as output signals on one of the lines 172 to the image processing system 120, or to the image source 125. The CORRECTION VALUE signals are signals that are utilized to adjust color correction parameters within the image processing system or telecine. For example, if the image processing system is a color corrector, the CORRECTION VALUE signals provided by the control unit 170 can include values for controlling a selected video signal parameter such as gain, gamma, or black, or hue, saturation, or luminance if such a color domain is employed.

The workstation 100 further includes a video capture device 180 coupled to the data input port 177. The video capture device is shown coupled to the image analyzer 160 to provide image data. The video capture device is physically connected to the data input port 177 associated with the workstation so as to allow video image to be input into the workstation. In the preferred embodiment, the input port 177 is coupled to the selector switch 175, which allows selection between a source image from the image source 125 or a processed image from the image processing system 120.

In systems where analog video signals are provided, the video capture device 180 may include a digitizer for converting the signals into digital form for processing in the manner described herein. Alternatively, the data input port 177 can be merely a digital bus, serial port, parallel port, network interface, or other data port associated with the workstation which receives predigitized video signals from the image source 125 or image processing system 120.

As described above, the functional block of the image analyzer 160 is preferably a software process or application program that runs in the workstation 100. Although the preferred embodiment will be generally described in the context of an application program running in a computer-based workstation, those skilled in the art will recognize that the present invention can also be implemented in conjunction with other types of computer systems such as a personal computer (PC), a personal workstation (PW), or dedicated hardware circuits, and that the program modules described herein for carrying out the methods described herein can be implemented in such systems.

Further, those skilled in the art will recognize that the invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks (LAN) of an office, enterprise-wide area networks (WAN), and the like. Accordingly, it will be understood that the term workstation, computer, operating system, program, module, routine, and application generally include all types of computers and program modules designed for them.

The detailed description which follows of the processes employed in the present invention is represented largely in terms of processes and symbolic representations of operations by computer components, including a central processing unit (CPU), memory storage devices for the CPU, connected display devices, and input devices. Furthermore, these processes and operations may utilize conventional computer components in a heterogeneous distributed computing environment, including remote file servers, remote computer servers, and remote memory storage devices. Each of these conventional distributed computing components is accessible by the CPU via a communication network, which is not shown in FIG. 1. Those skilled in the art will recognize and appreciate that such a communications network may be a LAN or may be a geographically disbursed WAN, such as the Internet or an enterprise-wide computer network, all of which can provide source images from some type of image source, store unprocessed or processed images, and carry out image processing, and thereby serve as an image processing system 120, image analyzer 160, image and data storage device 150, video capture device 180, control unit 170, etc. and can store images and data on behalf of the workstation 100 which is described as the preferred embodiment.

The processes and operations performed by the computer in the workstation 100 include the manipulation of signals by a CPU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

For the purposes of this discussion, a "process" is generally considered to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, bytes, works, values, elements, symbols, characters, terms, numbers, points, records, objects, images, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, clicking, selecting, moving, positioning, placing, altering, etc. which are often associated with manual operations performed by a human operator. The operations described herein are machine operations performed in conjunction with various inputs provided by a human operator or user that interacts with the computer.

In addition, it should be understood that the programs, processes, methods, etc. described herein are not related or limited to any particular computer or apparatus, nor are they related or limited to any particular communication network architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

From the foregoing discussion, those skilled in the art will understand that the functional blocks shown in the workstation 100 in FIG. 1 comprise software modules operating as described herein, in conjunction with the physical circuitry and components of the workstation. Those skilled in the art will therefore appreciate that FIG. 1 and the associated discussion are intended to provide a brief, general description of the preferred computer workstation hardware and program modules, and that additional information is readily available in the appropriate programming manuals, user's guides, and similar publications.

EXAMPLE OF COLOR FREQUENCY DISTRIBUTION

The preferred embodiment of the present invention is operative to analyze an incoming image and calculate the color distribution of the image as a frequency distribution, e.g. the frequency of occurrence of a particular signal level in a particular color channel for an entire video frame. As previously described, such color distributions include, but are not limited to, a histogram in RGB or other color space, a hue/saturation or vectorspace distribution, samples of color levels in a group of defined areas, etc. Certain characteristics of the frequency distributions are then extracted and utilized to determine the difference between a reference image and a source or target image. These characteristics include, but are not limited to, the center of populations (peaks in a histogram), boundaries of populations, such as rising edge or falling edge of a peak in a histogram, weights of divided distribution areas (sub-totals in histogram level such as 0-15, 16-31 . . . . , 238-255), etc. When an operator adjusts a set of controls to reach a desired balance, the preferred embodiment stores these preferences as color distribution characteristics. Later, the operator can cause the system to make a different image's characteristics match the stored reference ones. The preferred system can automatically tune the corresponding controls, by providing the CORRECTION VALUE signals to make an input image's characteristics match the stored reference ones.

A histogram is but one type of color distribution considered usable in the present invention. Other types of statistical measures are also considered equivalent, including by way of example, but not of limitation, cumulative frequency distributions, relative frequency distributions, categorical frequency distributions, arithmetic mean and other measures of central tendency, harmonic mean, quadratic mean, median, mode, measures of variation and skewness, and standard and other deviations.

Referring now to FIG. 2, a preferred embodiment of the present invention will be described in conjunction with a histogram taken in RGB color space. Each scene or image will have a certain histogram pattern. For example, consider a gray scale test image 200 such as shown in FIG. 2A. In this test image, it will be seen that there are four bars of progressively darker gray shades. A gray scale test image will have an identical histogram for each of its red, green and blue channels with overlapping histograms, since by definition gray implies equal R, G, and B.

FIG. 2B illustrates the histogram that would be produced for the test image 200. Since R, G, and B must be of equal intensity to produce a neutral or gray tone, the histogram will contain four regions where there are large numbers of pixels in the image having close intensity values. The typical histogram utilized in the preferred embodiment is shown graphically as an X-Y graph where the Y axis is the number of pixels or a count of pixels (the frequency of occurrence) and the X axis is the intensity. Thus, the region 205 is a high pixel count for a relatively low intensity, which would correspond with the dark region 210 in the image 200. In like manner, there are four regions or concentrations of high pixel counts, which indicate the large numbers of picture elements at the four intensities shown in FIG. 2B.

The effect of a GAIN variation when operating in the RGB domain and utilizing GAIN, GAMMA, and BLACK controls, is to adjust the intensities in a selected channel at the higher end of the intensity scale. For example, FIG. 2C illustrates the effect on the color distribution or histogram in the event that the GAIN control for the red channel is adjusted upwardly. The effect is to cause a spread of the red GAIN histogram or movement towards the higher end of the intensity scale. Note that the GAIN of the green and blue channels remains the same, so that their histograms remain overlapping. Note further that a GAIN adjustment has a greater effect at the high end of the intensity scale than at the low end of the intensity scale, yielding a larger difference between the G, B histogram and the R histogram at high intensities (larger Δ) than at lower intensities (small Δ).

Referring now to FIG. 2D, a BLACK level adjustment in the RGB domain is more pronounced in the lower intensity range. FIG. 2D illustrates the effect of an adjustment to the BLACK level control in the green channel. Since BLACK level adjustments have greater influence at lower intensity levels, there is shown a large difference (large Δ) between the green channel G and the R, B channels. Note further that the effect is more pronounced at lower intensity levels than at higher intensity levels, which results in a small difference at high intensity levels (small Δ). The red and blue histograms in this case remain overlapping, indicating that the black levels in the R and B channels remain virtually identical.

From the foregoing illustration in FIG. 2, it will be understood that the determination of a color frequency distribution in a RGB color system entails a count of the number of pixels in a given video image that possess a particular intensity value. For digitized color values, this is readily carried out by storing the image to be analyzed in the workstation's memory, in triplets of R, G, and B values associated with X-Y picture coordinates (or line number and pixel position along the line). The workstation is then operative to analyze the stored image to determine the values of R, G, and B at each pixel location in the entire image, and to create a count for each of the possible intensity value. The example of FIG. 2 presupposes a range of intensity values from 0–255, assuming 8 bit quantization of the intensity level, for a typical NTSC CCIR 601-1 video frame having 486 lines per frame and approximately 720 pixels per line, yielding a total of 349,920 pixels in the active image area. For three channels of R, B, and G at eight-bit color, this requires memory storage of 1,049,760 bytes in the workstation memory for storage of a single image.

Those skilled in the art will understand that other video formats, such as HDTV, digitized 35 millimeter film, PAL, SECAM, etc. utilize other resolution standards and require additional data storage. Similarly, a system that utilizes 36-bit color, as opposed to 24-bit color, will require one/third more memory for storage of an image.

FIG. 3 illustrates alternative color frequency distributions that can also be implemented in the present invention. Those skilled in the art will understand that color information can also be represented in the hue/saturation domain, common to that of NTSC color, where hue is represented by phase angle of a vector on a color circle, with saturation being represented by the length of the vector. A color distribution in the hue/saturation color domain can be represented by hue angle vs. number of pixels, saturation vs. number of pixels, etc. Adjustments to hue involve angular rotation of the vector, while adjustments to saturation of a selected hue involve adjustments to the length of a vector at the selected hue angle.

Figure 3A:
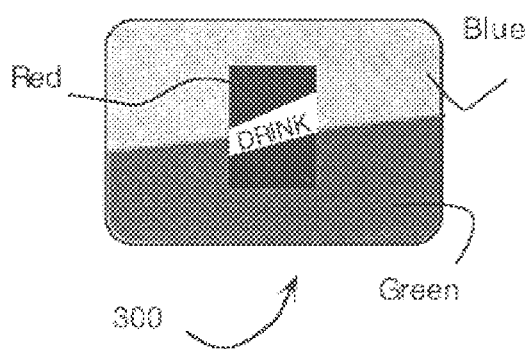
FIG. 3, consisting of FIGS. 3A, 3B, 3C, 3D, 3E, and 3F illustrates an alternative color distribution in the form of a vectorscope representation of an exemplary video scene and associated histograms in hue/saturation or vectorspace distribution.
Figure 3B:
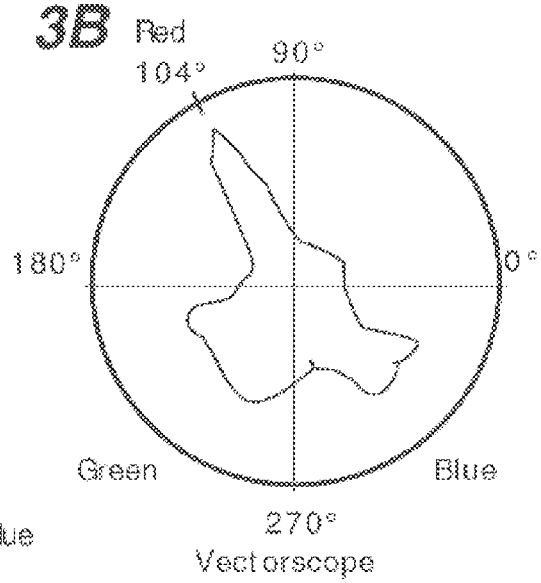
Figure 3C:
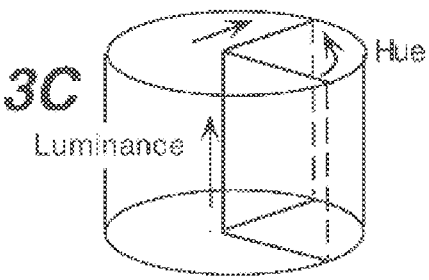

FIG. 3A illustrates an exemplary video image 300 comprising a red soft drink can sitting on a green surface with a blue sky background. Those skilled in the art will understand that a vectorscope or color circle representation of this image has an appearance similar to that shown in FIG. 3B. Note the substantial intensity of the red hue at approximately 104 degrees on the color circle, with a less saturated region of blue corresponding to the blue sky portion of the image, and a fairly broad section of green tones corresponding to the green base of the image. In FIG. 3C, the vectorscope representation of FIG. 3B is "three-dimensionalized" to show luminance along the Z axis.

Figure 3D:
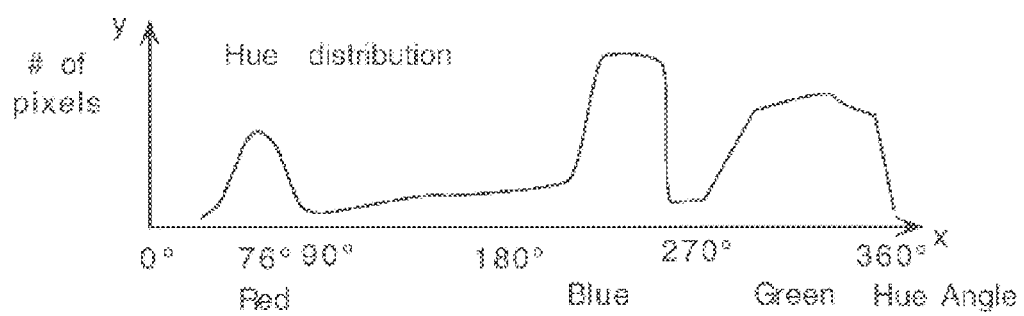
Figure 3E:
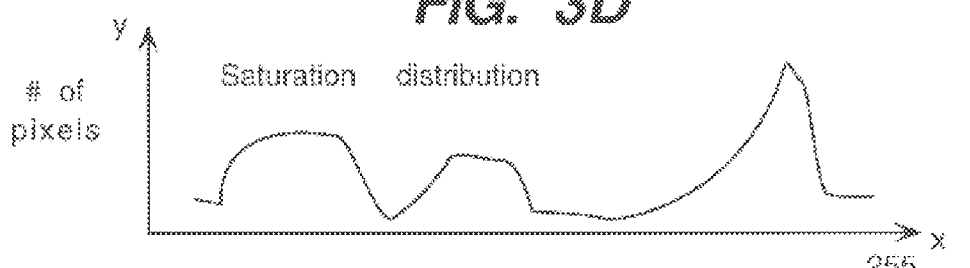
Figure 3F:
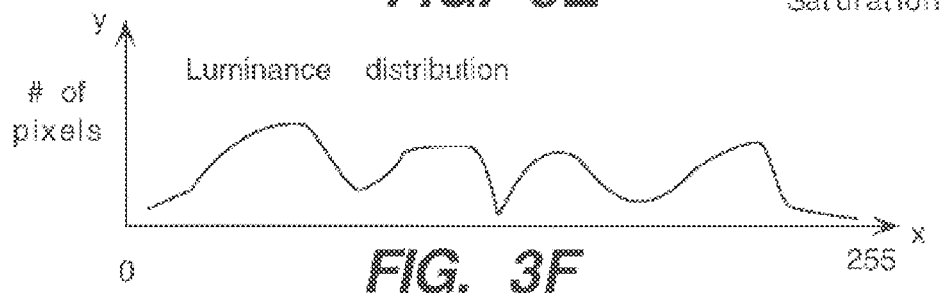

Color distributions in a form of histograms for these particular color representations is shown in FIGS. 3D, 3E, and 3F. FIG. 3D illustrates a histogram with hue angle as the X axis ranging from 0° to 360° and the pixel count as the Y axis. FIG. 3E illustrates a histogram with saturation as the X axis and pixel count as the Y axis. FIG. 3F illustrates a histogram with luminance as the X axis and pixel count as the Y axis.

These histograms illustrate that the hue of the image 300 has 3 predominate color regions concentrated at red corresponding to the drink can, blue corresponding to the blue sky, and green corresponding to the base. Similarly, the saturation shows strong concentration in the regions of red, blue and green, with the strongest concentration and saturation in the green region as this is shown as the most saturated color after red. Luminance varies in accordance with the known matrix relationship between luminance and R, G, and B.

From the foregoing, those skilled in the art will understand that a color distribution can be determined from many different types of color representations or systems and employed in the preferred embodiment of the present invention.

Turn next to FIG. 4 for a discussion of the main screen 400 labeled "Colorist Assistant" that is displayed by the workstation 100 as a part of the user interface in the preferred embodiment of the present invention. The main screen 400 is preferably displayed on the workstation monitor 102 as a repositionable and resizable window and preferably includes customary user controls such as a close box 401, a title bar, a menu button (M), and other computer user interface conventions known to those skilled in the art. Particular to the preferred embodiment of the present invention is the provision of a plurality of reference image thumbnails or icons 405a, 405b, 405c, . . . 405j. These icons, also called "visual scene representations" or "VSRs", are miniaturized versions of captured video images that are displayed in reduced form to provide a visual reference to an operator. Although ten VSRs 405 are shown, it will be understood that any number of VSRs can be provided, with means (not shown) for scrolling through a number of these VSRs to display those that are not visible in the immediately active window.

A selected current reference image 410 is shown with a highlighting box 412 shown around the selected VSR to indicate that this particular VSR is selected. By clicking on any of the displayed VSRs 405 the operator can select a different image, and its associated color distribution characteristics, for use as a reference image in performing the automated color correction in accordance with the present invention.

The main screen 400 further includes control selector buttons 415 to allow operator selection of a particular video control parameter. In the preferred embodiment, there is provided a BLACK selector box 415a, a GAMMA selector box 415b, and a GAIN selector box 415c. It will be understood that these color control parameters can be hue, saturation, luminance, or other video control parameter, as desired.

A draggable spot size selector handle 420 and scroll bar 422 is provided to allow selection of the size of an area of interest or "spot", e.g. spot 105 in FIG. 1 on the TID 104. Preferably, the system allows generation of a predetermined region or spot on the video monitor 104 so as to allow operation selection of a predetermined geometric region of a displayed image. In the preferred embodiment, the size and location of the predetermined region are dynamically adjustable during the step of obtaining a reference image as well as during the matching process.

The area of interest in FIG. 1 is shown at 105. By (1) clicking at a predetermined region in the TID 104 to select a starting point, and (2) dragging the spot size selector handle 420 along the scroll bar, the operator can adjust the position and size of the area of interest on the TID 104 to be smaller or larger, as desired. In many color correction applications, an operator will desire to designate a small area of interest or spot that encompasses a particular region on the displayed image. This region often contains a single color that the operator is interested in observing, adjusting, or using as a reference. As will be described in greater detail below, the system allows selection of either an entire image for computation of an appropriate histogram or other color distribution, or alternatively selection of a predetermined geometric area. Although the preferred embodiment is described in conjunction with a rectangular spot that is controlled by spot size selector handle 420, it will be understood that other means and mechanisms could be provided by selecting a particular geometric region on the screen or a particular color region. A spot size selector is deemed equivalent to that described herein if it permits selection of a predetermined geographic region, a predetermined color characteristic, a predetermined color, or any other visual attribute displayed on the color monitor.

Referring again to FIG. 4, the main screen 400 further includes three activatable control buttons labeled Match, Cancel, and Set. The Match button, when pressed or clicked, causes the system to carry out a match process to match a selected reference image and its color distribution characteristics, as indicated by the selected current reference icon highlighted with the highlighting box 412, to the displayed image on the TID monitor 104. Steps associated with the Match process are described in conjunction with FIG. 8.

The Cancel button, when pressed or clicked, causes the system to halt a match process that may be underway.

A Set button, when clicked or pressed, causes the system to display a Set Reference screen (FIG. 5) so as to capture a displayed image and its characteristics as an additional reference via a Set process. Steps associated with the Set process are shown in conjunction with FIG. 7.

FIG. 5 shows the Set Reference screen 500 that is displayed in response to activation of the Set button on the main screen 400 in FIG. 4. The Set Reference screen also includes the usual user interface features of close box, title bar, and M (menu) button. The Set Reference screen 500 includes a region 510 for display of an icon or VSR that has been selected by the operator. When the Set Reference screen is closed or deactivated, the VSR shown in the region 510 will be displayed as one of the selectable VSRs 405 on the main screen 400.

The Set Reference screen further includes a Name field for entry of text to be associated with the particular reference being established. For example, the text string "BeachAtDawn" is displayed in the Name field. The operator can enter selected text in this field by using the mouse to click in the Name field and typing on the keyboard.

The Set Reference screen 500 further includes a Whole and Spot radio buttons that permit indication whether the reference being established is either the whole image displayed on the monitor 104 (FIG. 1) or merely the area displayed within the area of interest 105. As will be known to those skilled in the art, a radio button type control is mutually exclusive.

A Histogram Offset array 540 is also provided for display of the numeric values determined as a result of the computation of histogram of the displayed image. In the embodiment shown in FIG. 5, there is a separate line for each of the three color parameters red, green and blue, with separate columns for values of low, peak, and high. When the system is instructed to "initialize" or compute the histogram of the displayed image (whole or spot), the computed values for the low edge of the histogram, the peak, and the high edge of the histogram, for each of the red, green, and blue channels, are displayed in the Histogram Offset array.

Preferably, these values are operator-selectable. Even though the system may have calculated values from the displayed image, the preferred system allows operator override of these values by clicking in a particular cell of the array and entry of a numeric value.

The Set Reference screen 500 further includes a Telecine Color Offset array 550 that permits entry of particular values for BLACK, GAMMA, and GAIN for each of the red, blue, and green channels. The Telecine Color Offset array is used to provide additional "handles" for that facilitate different operator biasing in controlling the color corrector. Offsets are image source or processing system dependent, as well as user preference dependent; the offset is used to limit or modify the control parameter adjustments. In addition to BLACK, GAMMA, and GAIN, the offsets can include, but are not limited to, the rate or speed of adjustment, the total adjustment (offset or range) allowed, and the expected value difference between the source image and the reference which is a threshold for terminating the match process. The offsets are set by the user according to his or her experience with the image source or image processing system.

The Set Reference screen 500 further includes a draggable control handle 530 and scroll bar 532 that can be utilized to change the values in the Histogram Offset array or the Telecine Color Offset array. By clicking on and dragging the handle 530 along the length of the scroll bar, the operator can increase or decrease a selected number in one of the offset arrays. Preferably, when the user clicks on one of the numeric values in the offset arrays, the draggable control handle is drawn by the system in a position along the scroll bar 532 proportionate to the numeric value so as to permit upward or downward adjustment, between the allowable limit of 0 and 255.

Finally, the Set Reference screen 500 include four buttons—an OK button, a Cancel button, a Capture button, and an Init button. The OK button, which clicked or pressed, stores the values entered in the Set Reference screen in a data structure associated with the selected VSR so as to memorize a particular reference image and its associated statistical video image data for later use by the operator.

The Cancel button, when pressed or clicked, exits the Set Reference screen 500 and returns to the main screen 400. No values that were displayed on the screen are saved.

The Capture button, which clicked or pressed, causes the capture and iconization of the video image presently displayed on the video monitor 104. If the "Whole" radio button is depressed, the entire image 104 is iconized, while if the "Spot" radio button is depressed, the average color within the area of interest 105 is displayed.

The Init button, when clicked or pressed, causes the system to compute the histogram of the image, either whole or spot, and display of the calculated values in the Histogram Offset array.

AUTOMATED METHODS FOR COLOR CORRECTION

Figure 6:
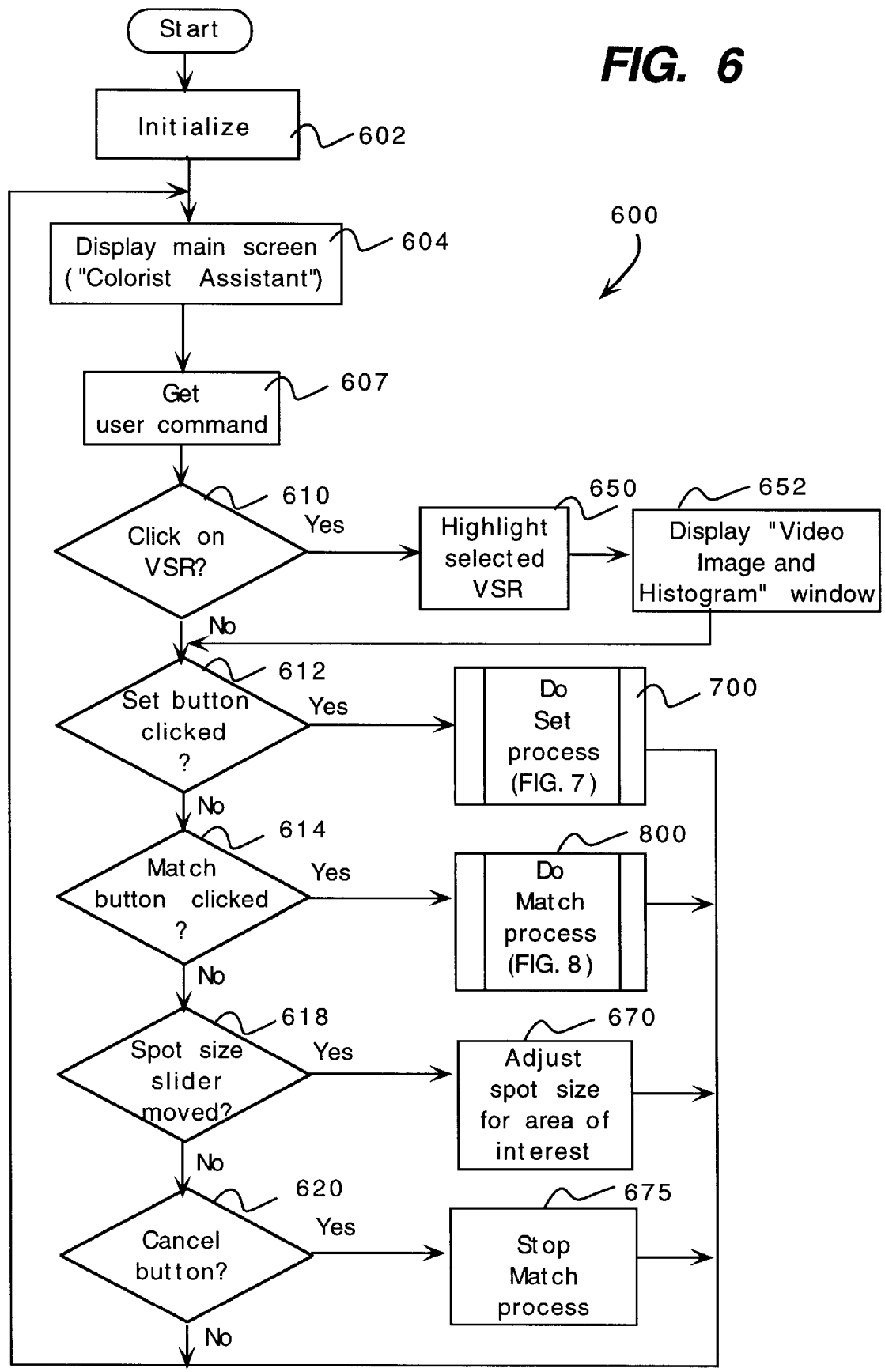
FIG. 6 is a flow diagram of the computer program code or routine carried out in the computer workstation employed in the preferred embodiment of the present invention.

With the principles of color distribution, histogram computation, and exemplary user interface screens 400, 500, and 900 in mind, turn next to FIG. 6 for discussion of the general process by which the workstation 100 as shown in FIG. 1 carries out the preferred embodiment of the present invention. The main process 600 in FIG. 6 comprises a number of computer-implemented operations that can be effected from an application program module, or as a part of a program module, to carry out data processing operations to cause automated color correction in accordance with the preferred embodiment of the present invention. Although the example given is in the context of a color distribution in the form of histograms for the red, blue and green video signal channels, and control of the BLACK, GAIN and GAMMA video parameters, those skilled in the art will understand that the routines or operations described are exemplary and that other data processing operations, for other types of color representations and distributions, for other types of controls, are deemed equivalent and in accordance with the present invention.

Preferably, the process 600 is effected as a part of an overall color correction application program that runs on the workstation 100. This program can carry out other aspects of color correction or control of devices such as an image source, an image processing system, an image utilization device, displays, and other aspects as described. The steps shown in the process 600 are carried out when a command is provided to carry out the automated color correction in accordance with the present invention.

Whenever the system is first activated, step 602 is invoked to initialize the system for processing. When invoked, the initialize process 602 is called to allocate a predetermined region of memory, typically in RAM, for storage of a data file structure such as is shown in FIG. 12. Further, any prestored VSRs and associated statistical data for reference images are recalled from a storage device and made accessible. Once initialized, control passes to step 604, where a process is invoked to display the main screen ("Colorist Assistant") 400 of FIG. 4. Control then passes to step 607, to wait for a user command, typically input by the keyboard, a mouse or other control device connected to the workstation.

When a user input is received, the command is tested by decisions 610, 612, 614, 618, 620 to determine the particular control invoked.

If at decision 610 a particular VSR is clicked on by the operator, control passes to step 650, where the selected VSR is highlighted with the highlighting box 412. The highlighted or selected VSR remains highlighted until the operator selects a different VSR.

If at decision 612 the Set button is clicked, control passes to step 700 where a Set process is carried out. The Set process is described in conjunction with FIG. 7. The Set process causes display of the Set Reference screen 500 as shown in FIG. 5 and allows the user to manipulate the controls associated with this screen. The operator would return from the Set process 700 after the OK or Cancel button is hit from screen 500.

If at decision 614 the Match button is clicked, control passes to step 800, where a Match process or routine is carried out. The Match process is described in conjunction with FIG. 8. Typically, carrying out the Match process causes the system to begin an iterative routine of matching the color distribution characteristics of the target image displayed on the video monitor 104 to the color distribution characteristics of the selected reference image. The operator can control and observe the process by observing the TID 104, and switching between the image source and the output of the image processing system.

In the preferred embodiment, switching between the image source and the output of the image processing system is effected by generating separate main windows (Colorist Assistant of FIG. 4) on the workstation monitor 102, a first window associated with the image source 125 and a second window associated with the image processing system 120. Those skilled in the art will understand that the preferred Da Vinci RENAISSANCE 8:8:8™ color corrector (image processing system 120) is responsive to commands to switch into a "bypass" mode. By clicking on a window associated with the image processing system, the image processing system provides the processed image on line 128 to the TID 104. By clicking on the window associated with the image source, the image processing system shifts into the bypass mode and provides the source image on line 128. It will further be understood that the preferred image processing system 120 is operative in response to signals on lines 172 from the workstation 100 for generating the area of interest box 105 in the signals provided on line 128, so that the spot area can be selected, moved, resized, etc.

If at decision 618 the Spot size control 420 has been moved, control passes to step 670, where the area of interest 105 on the video monitor 104 is adjusted in accordance with the position of the control. Alternatively, those skilled in the art will appreciate that a draggable cursor can be utilized to select the center or a corner of the Spot, with a click and drag operation utilized to click and set an initial point with a drag to create the area of interest 105, with release to set a final size of the area of interest box, If at decision 620 the Cancel button has been clicked, any Match process if presently underway is terminated, as shown at step 675.

After completion of any of the processes of 700, 800, 670, 675, control passes back to step 604, the main screen is refreshed, and the system poised to receive another user command. The steps shown in FIG. 6 are carried out in an infinite loop until the main process 600 is terminated by a known operating system command such as by clicking on the known close box or entry of a "quit" command via the keyboard.

Figure 7:
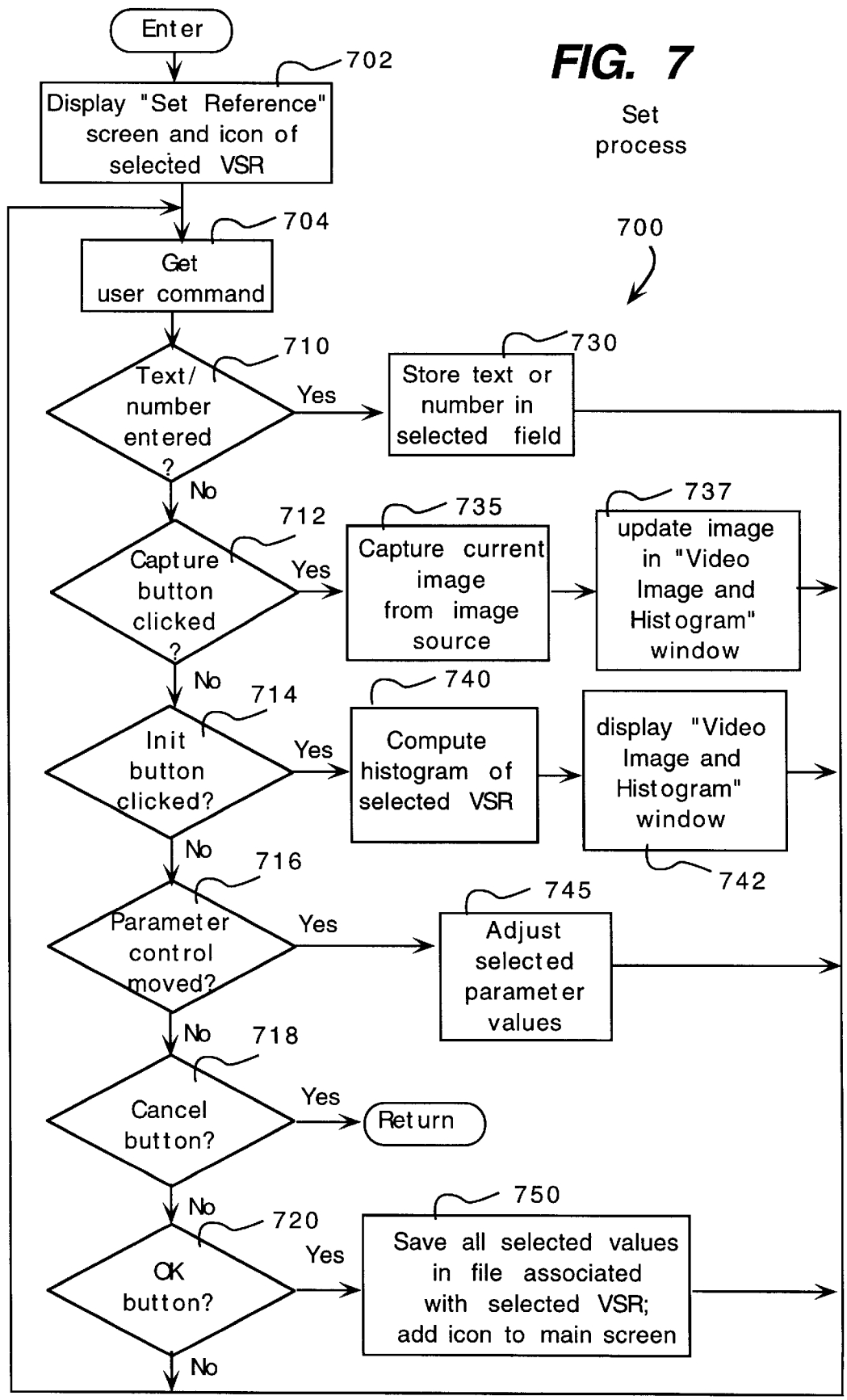
FIG. 7 is a flow diagram of the Set Process.

FIG. 7 illustrates the steps taken to carry out the Set process 700. The first step 702 taken in the Set process causes display of the "Set Reference" screen of FIG. 5 and the corresponding icon of the selected VSR shown at 412 in FIG. 4. Control then passes to step 704 where the system waits for a user command input via mouse, keyboard, etc. In response to entry of a user command, decision steps 710, 712, 714, 716, 718, 720 are carried out to test the command and determine the command and provided by the operator. The steps of testing for user command and carrying out the selected command are repeated in an infinite loop fashion until the Set process is terminated, typically by clicking the OK button or the Cancel button.

At decision 710, if the Name field has been activated by the user's clicking in the field, the system awaits entry of a text. Similarly, numerical data can be entered into the Histogram Offset or Telecine Color Offset arrays by clicking in one of the cells of the arrays and entry of a numerical value. Control branches to step 730, where any text or numbers provided in selected fields are stored in a temporary buffer. The numbers in the temporary buffer are not saved in the permanent data structure associated with the particular reference image being manipulated, but the numbers are utilized on a temporary basis until saved or the process terminated.

At decision 712 if the Capture button is clicked or pressed, control passes to step 735 and the current image displayed on the TTD monitor 104 is iconized and displayed as the VSR in the region 510 on the screen 500 (FIG. 5). It should be noted that the only purpose of the Capture button is to capture an image or icon for purposes of creating a VSR. No histogram is computed nor are any values altered by a mere capture operation, the intent being merely S to capture and iconize an image for the VSR. The captured image is also a function of whether the Whole or Spot radio button is depressed. If the Whole radio button is depressed, the entire image on the monitor is iconized and captured, whereas if the Spot button is depressed, the average color within the area of interest 105 is calculated. The icon is stored in a temporary buffer and displayed until it is saved with the OK button or discarded with the Cancel button. Control returns to stop 104.

If at decision 714 the Tnit button is clicked or pressed, control passes to step 740 and a process carried out to compute the histogram of the selected VSR. It is contemplated at this stage that the image being displayed on the TID monitor 104 is desired as a reference image, and the color distribution characteristics of this image are to be determined. Thus, at step 740 a "Video Image and Histogram" window as shown in FIG. 9 is displayed in a separate region on the workstation monitor 102, the VSR associated with this image is displayed in the appropriate region of this window, and a graphical representation of the histogram is displayed. When this operation is complete, control returns to step 704.

The values determined by analysis of the selected image are then displayed in the Histogram Offset array on the Set Reference screen 500.

If at decision 716 the parameter control 530 has been moved, the value associated with any of selected numerical value in the Histogram Offset array are adjusted upwardly or downwardly accordingly at step 745. It is assumed that the user has previously clicked in one of the array locations to select a particular numeric value for adjustment. After any selected parameter values are adjusted, control returns to step 704 to get another user command.

If at step 718 the Cancel button has been clicked or pressed, any Init process presently being carried out is terminated acid the Set Reference screen 500 is closed. None of the temporary values are saved, and the selected VSR and its associated Histogram are left unchanged.

If at decision 720 the OK button is clicked or pressed, control passes to step 750, where all indicated values associated with the selected VSR are saved in a data structure (FIG. 12) associated with the particular reference. Any pre-stored data values for the Histogram Offset or Telecine Color Offset, and the VSR icon, are overwritten. Accordingly, the color distribution characteristics of the newly-created reference image have now been "set" and stored for later use by the operator. In this manner, the operator has created a reference by which subsequent operations can be carried out in a Match process, as will be described next.

Figure 8:
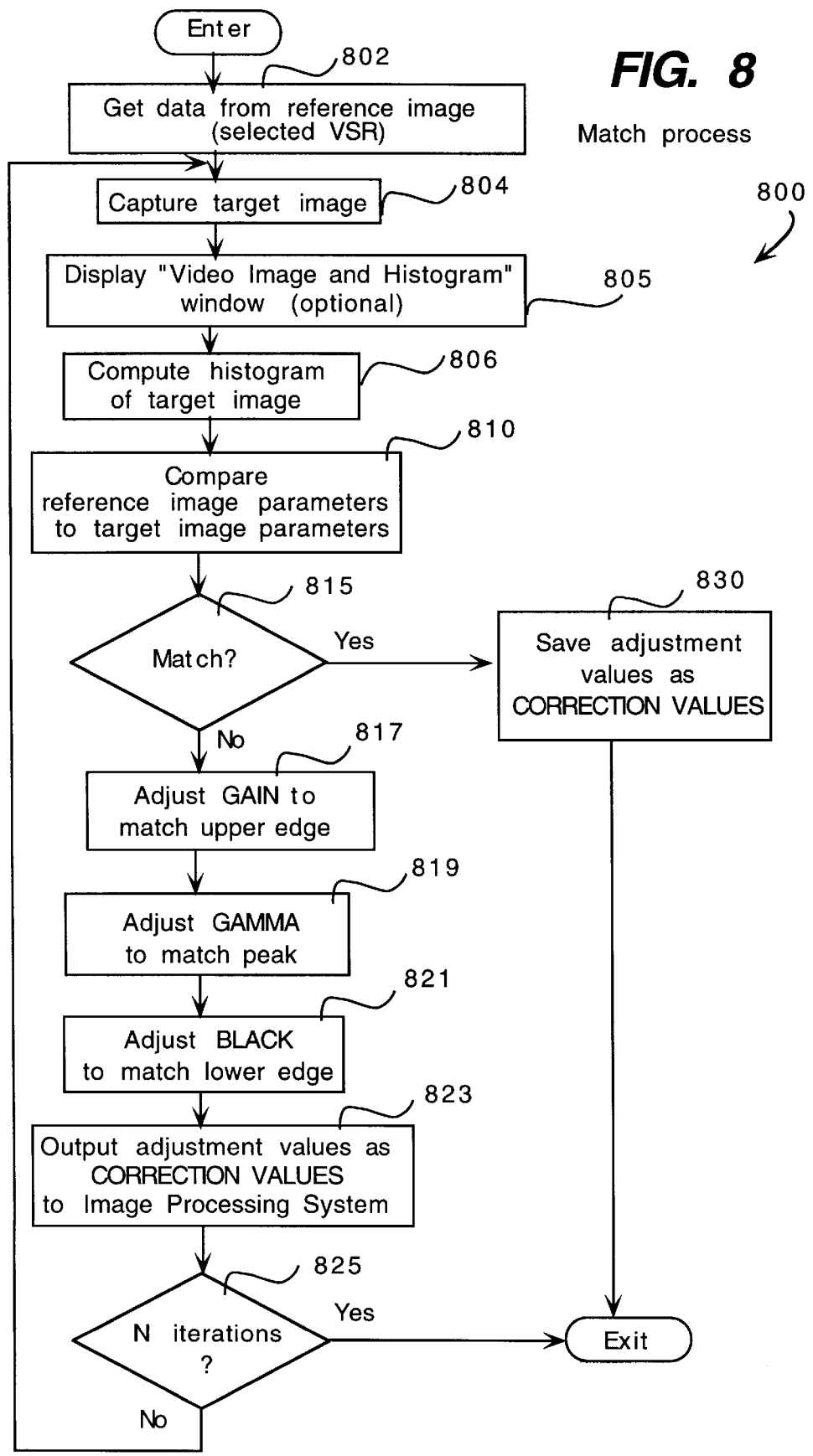
FIG. 8 is a flow diagram of the Match Process.

FIG. 8 is a flow diagram of the Match process 800 that is carried out in the preferred embodiment of the present invention. In this operation, the video parameters of a target image, typically displayed on the TID monitor 104, are iteratively adjusted until they match the corresponding video parameters of a selected reference, as represented by a selected VSR and its associated video parameters. The system provides a sequence of CORRECTION VALUE signals to the image source 125 (if for example a telecine is being set up), or to an image processing system 120, as may be selected, to cause the video parameters of the target image to be adjusted. In a scene by scene color corrector, the final value of the CORRECTION VALUE signals may then be applied to an entire scene comprising a plurality of frames or images provided from the image source 125, corrected by the image processing system 120, and then provided as a processed image to the utilization device 120. Accordingly, FIG. 8 is an important step in the overall process of the present invention, in that it allows the automated determination of video parameter correction values, GAIN, GAMMA, and BLACK for red, green, and blue channels in the preferred embodiment, and application of these correction values to one or more source images.

The process 800 is invoked, as will be recalled, when the Match button on the main screen 400 (FIG. 4) is clicked or pressed. In response, the first step taken at 802 is to retrieve appropriate data from the selected reference image. This data is stored in the data structure in the image and data storage device 150, in a form such as that shown in FIG. 12. Once the data is retrieved from memory and loaded into RAM, control passes to step 804.

At step 804, the target image is captured.

At optional step 805, a "Video Image and Histogram" window for the target image may be generated on the workstation monitor so that the operator can observe the progress of computing the color distribution of the target image and the matching. However, it will be understood that in normal automated match process, a Video Image and Histogram window is not displayed, but is considered helpful in aiding the user to understand the process being carried out.

As another optional feature of the invention, the workstation monitor 102 can display two separate Video Image and Histogram windows, one associated with the target image and one associated with the selected reference image.

This allows the operator to visually compare the histogram of the target image to the histogram of the reference, and observe the matching process.

At step 806, the system computes the histogram of the target image and displays the histogram within the Video Image and Histogram window associated with the target image. At step 810, the computed target image parameters are compared to the reference image parameters. In the preferred embodiment, the comparison step entails comparing the values of the upper edge, the peak, and the lower edge of the histograms for each of the red, green, and blue channels. This essentially corresponds to comparison of the GAIN, GAMMA, and BLACK levels for each of the red, green, and blue channels, respectively.

At decision 815, the inquiry is made whether the video parameter values of the target image match the corresponding parameter values of the reference image within a predetermined error margin. If the values do not match, the "no" branch is taken to steps 817, 819, and 821 to adjust the GAIN, GAMMA, and BLACK levels. In the preferred embodiment, the adjustment process in steps 817, 819, 821 entails computation of the difference between the respective values for GAIN, GAMMA, and BLACK for each of the red, green, and blue channels, examining the computed difference to ensure that the difference is within an expected range of values, and determination of a predetermined adjustment value that is provided as a CORRECTION VALUE signal output from the control unit 170 (FIG. 1). Preferably, and as described in connection with FIGS. 9, 10, and 11, the difference between the target image parameter values and the reference image parameter values is transformed into a percentage adjustment.

In the preferred embodiment, the values provided as an output cannot exceed a predetermined range of adjustment, so a clipping operation holds the value between 0 and 100%. Similarly, to minimize the possibility of overshoot or undershoot, the values may be adjusted slightly less than the computed percentage difference between the target image parameter value and the reference image parameter value. These percentages can be adjusted in the Histogram Offset or Telecine Color Offset arrays in FIG. 5. Numerical examples illustrating these principles will be discussed below.

After the appropriate adjustment values are provided as CORRECTION VALUES to the image processing system or other utilization means, control passes to decision 825.

At decision 825, the inquiry is made whether a predetermined number N iterations of histogram computations and comparisons have been carried out. In the preferred embodiment, only a predetermined number of iterations, thirty in the preferred embodiment, are permitted before the process is terminated. This number may be adjusted upwardly or downwardly as desired. The inventor believes that a reasonable number of iterations should be permitted to allow convergence between the target image parameter values and the reference image parameter values. However, it will be understood that if a reference image is selected that has very little color distribution relationship to the target image, the parameter values may not converge. Accordingly, termination after N iterations provides means for ensuring that the matching process does not get stuck in an infinite loop. This is especially important when considering that many aspects of color correction are essentially non-linear processes and that the numbers might never converge if an unrealistic reference image is utilized.

If the predetermined number N iterations has been completed, the "yes" branch is taken from decision 825 and the Match process exits. On the other hand, if the predetermined number of iterations has not been carried out, the process loops back to step 806 and the histogram of the target image, now reflecting the CORRECTION VALUE adjustments, is computed. The process continues until there is a match at decision 815 or until a predetermined number of iterations is detected at decision 825.

Once a Match is determined at decision 815, the "yes" branch is taken to step 830 where the adjustment value provided as CORRECTION VALUES are saved. Anytime a correction value has been adjusted, it is preferably first saved in a data structure stored in RAM such as that shown in FIG. 12, and after a predetermined time period or upon a user command, the data is then saved to disk in a file. The file that is created can be named or renamed by the user.

After the CORRECTION VALUES are saved at step 830, the Match process exits and control is returned to the main screen. If the operator has not chosen an appropriate reference image and the Match has terminated either by Cancel or by completing the predetermined number of iterations, the operator may choose a different reference image and begin the process again.

FIGS. 9, 10, and 11 are examples of Video Image and Histogram display windows. In operation, the preferred system continuously captures input video and displays it on the left side of the window as a 24-bit color image. It also calculates the image's histogram of the red, green, and blue channels, and draws the histogram profile on the right side of the window. This window provide real time information about the automatic processing procedure being carried out. Any change in control parameters produces a new image on the left side, which then results in a new histogram on the right.

FIGS. 9, 10, and 11 also provide examples of the determination of the adjustment values for exemplary video parameters of GAIN, GAMMA, and BLACK level, for an exemplary channel such as red. It will be understood that the process described in connection with FIGS. 9, 10 and 11 can be carried out for the other color channels.

Figure 9A:
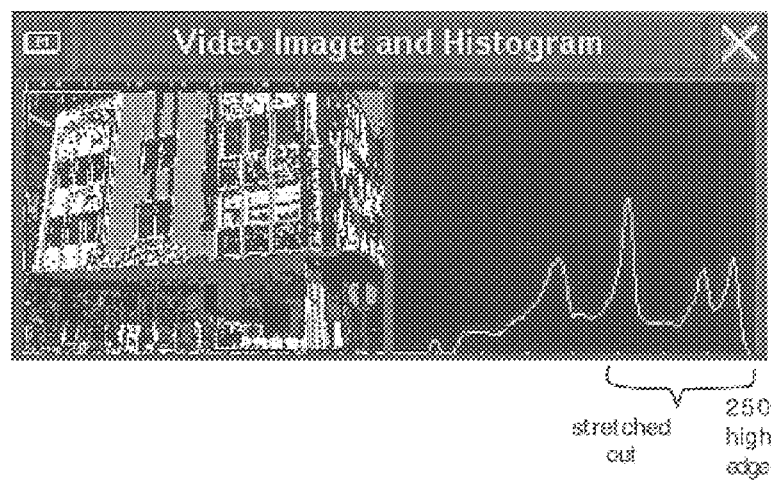
FIG. 9, consisting of FIGS. 9A, 9B, 9C, are exemplary Video Image and Histogram display screens illustrating a GAIN adjustment carried out in accordance with the present invention.
Figure 9B:
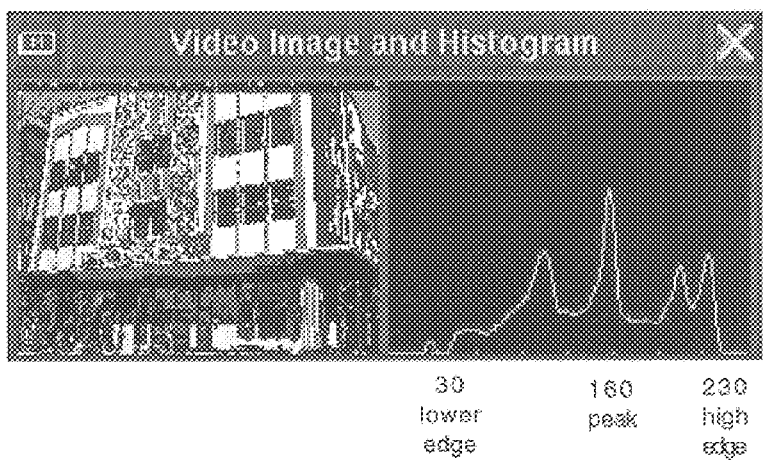

FIG. 9 illustrates the situation for a GAIN increase and decrease. FIG. 9B illustrates a Video Image and Histogram window 900 for a selected reference image. The window 900 in FIG. 9B includes the selected VSR and a graphical display of the histogram, in this case, for the red channel. Assuming a scale of values from 0 to 255, it will be observed that the lower edge of the reference histogram is at 30, the high edge is at 230, and the peak value is at 160.

Assume that the histogram of the target image is that as shown in FIG. 9A, with a high edge of 250. Since the high edge in FIG. 9A exceeds the high edge in the reference of FIG. 9B, the system will reduce the GAIN control parameter by a predetermined amount. In the example given, the difference between the high edge in FIG. 9B and the high edge in FIG. 9A is 250−230=20. Therefore, the GAIN in the red channel is reduced proportionately in the amount of 20/256, or about 7.8%.

Figure 9C:
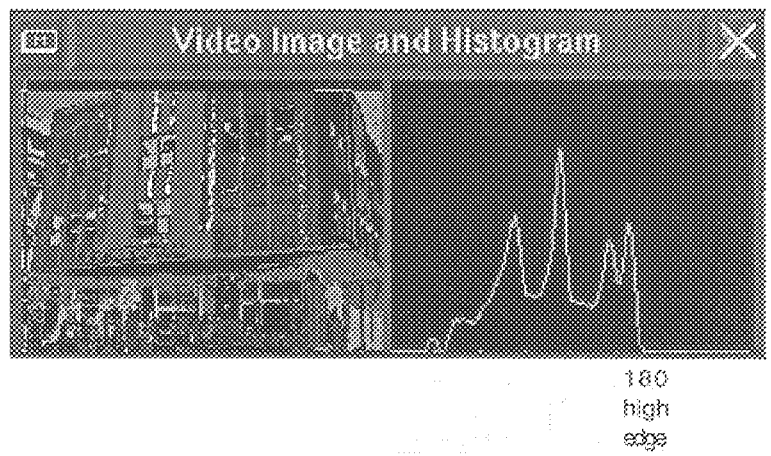

On the other hand, if the high edge of the target image histogram is lower than the high edge of the reference image histogram, the system will increase the gain control parameter. Thus, FIG. 9C shows an example where the high edge of the target image histogram is 180. The difference between the reference histogram in FIG. 9B and the target image histogram in FIG. 9C is 230−180=50. Accordingly, the system will increase the gain control parameter for the red channel 50/256=0.19, or approximately 19%.

Figure 10A:
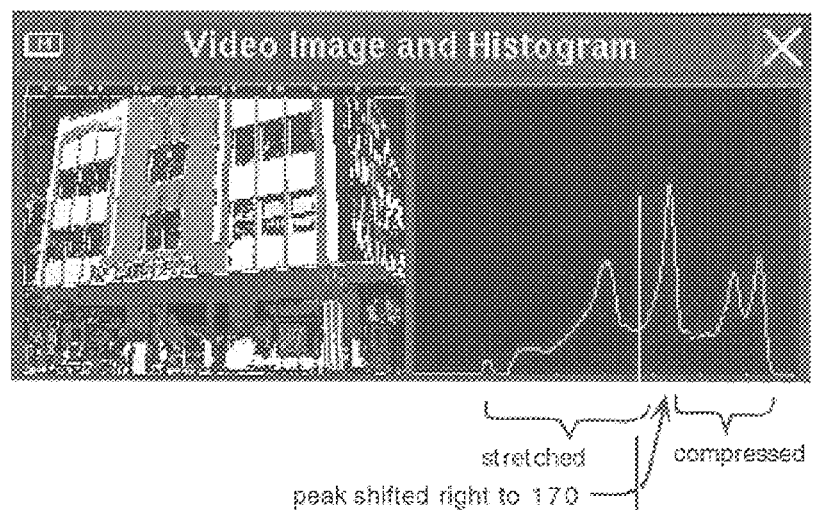
FIG. 10, consisting of FIGS. 10A, 10B, 10C, are exemplary Video Image and Histogram display screens illustrating a GAMMA adjustment carried out in accordance with the present invention.
Figure 10B:
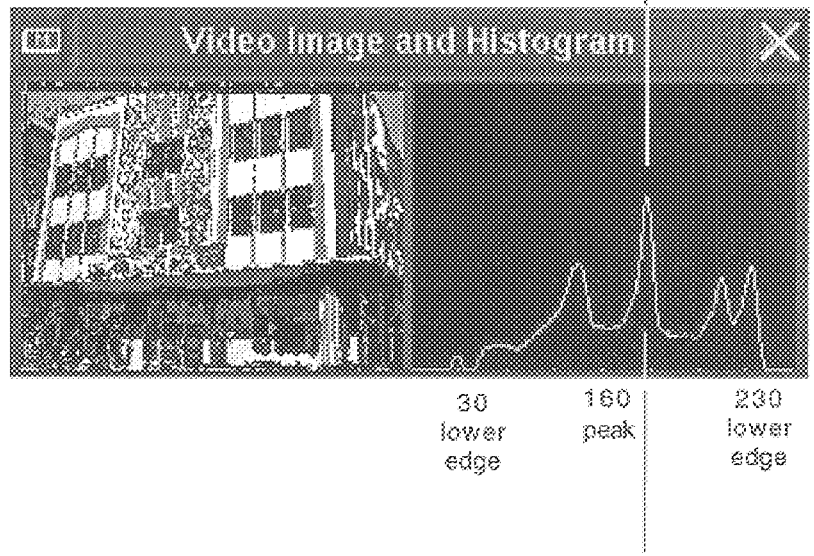

FIG. 10 illustrates adjustment of the GAMMA parameter for an exemplary channel. FIG. 10B is the reference image histogram, as in the case of FIG. 9B. In the example of FIG. 10, the peak of the histogram (the highest frequency of occurrence of a signal level) occurs at 160.

FIG. 10A illustrates the histogram of a target image where the peak occurs at 170. Note that the high edge is approximately at the same position as that of FIG. 10B (i.e. the gain does not require adjustment) so that the values above the peak are relatively compressed and the values to the left of the peak are relatively stretched out since the peak is somewhat shifted to the right. In this situation, the GAMMA parameter will be adjusted by the difference between the peak in FIG. 10A and the peak in FIG. 10B, namely, 170−160=10. The corresponds to a reduction of 10/256=0.039, or about 3.9%.

Figure 10C:
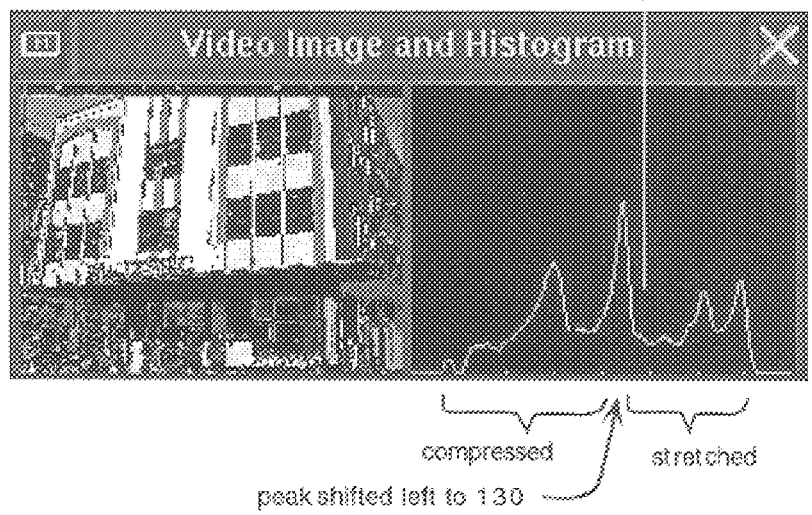

FIG. 10C illustrates a situation in which the target image's GAMMA parameter is low and should be increased. Note in FIG. 10C that the peak occurs at 130, resulting in the values above the peak being relatively stretched out and the values to the left of the peak being relatively compressed. In this situation, the GAMMA parameter for the exemplary channel will be increased. The amount of the increase is determined by the difference between the peak values, in this case 160−130=30. The increase is computed at 30/256=0.117, or about 11.7%.

Figure 11A:
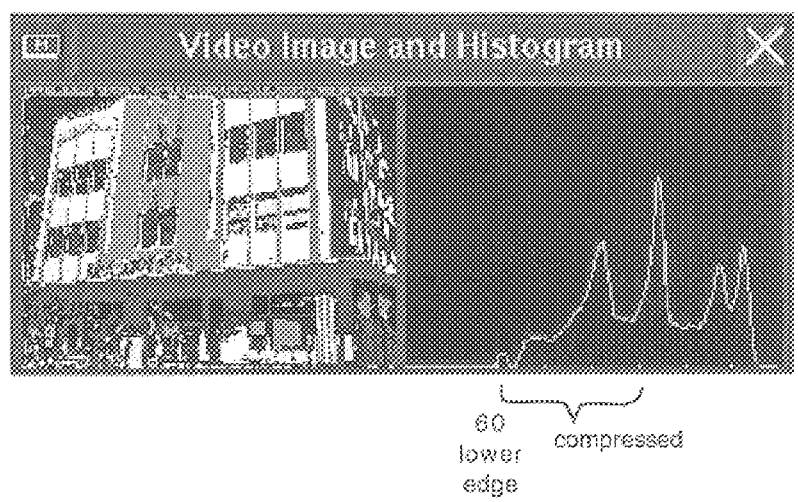
FIG. 11, consisting of FIGS. 11A, 11B, 11C, are exemplary Video Image and Histogram display screens illustrating a BLACK level adjustment carried out in accordance with the present invention.
Figure 11B:
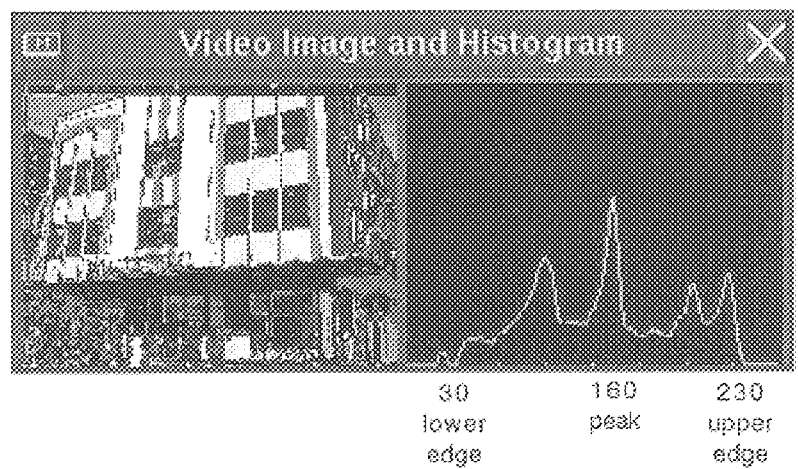

FIG. 11 illustrates adjustment of the BLACK parameter for the exemplary channel. Again, the reference image histogram is that at FIG. 11B. FIG. 11A is the histogram of a target image where the BLACK level is too high and should be decreased. Note that the lower edge of the histogram of the target image is 60, as compared to a value of 30 with a lower edge of the reference image in FIG. 11B. Accordingly, the BLACK level for the exemplary channel will be increased by the difference between the reference image parameter value and the target image parameter of 30. This corresponds to an adjustment value of 60−30=30, with the adjustment being 30/256=0.117, or about 11.7% decrease.

Figure 11C:
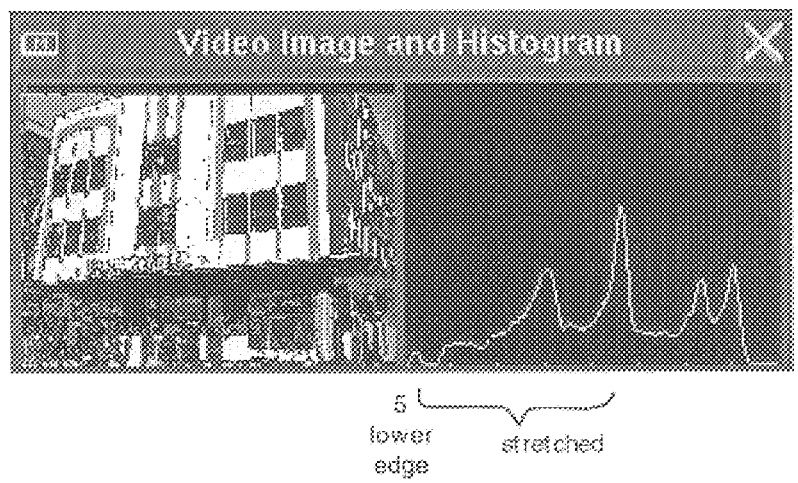

FIG. 11C illustrates a situation where the BLACK level and exemplary channel is too low and should be increased. The difference between the lower edge of the reference image and the lower edge of the target image is 30−5=25. This difference corresponds to an increase in BLACK level of 25/256=0.097, or about 9.7%.

It will now be appreciated that the described methods and system facilitate setting up a video image source to provide a wide dynamic range of signal levels prior to their input at the color correction equipment. The system allows the automatic scaling of the video signals from the image source so that a range of interest, e.g. 5,000–30,000 in a total range of 0–65,535, expands to fit the available dynamic range of the color correction equipment. The system is operative to provide control signals to the video image source equipment, e.g., gain, gamma, and black level, to scale the information to the dynamic range of the color corrector.

FIG. 12 is a table illustrating the data structure for the information that is stored in association with each reference image. Many of the parameters have been discussed previously and will be understood by those skilled the art. The data structure is stored in the workstation's memory and stored as a file on disk.

The Spot Flag is a flag or bit is used to indicate that the reference is used for spot or local area comparison. If the flag is set, parameter values stored in the fields Spot Red Color, Spot Green Color, and Spot Blue Color are employed to generate the VSR. The VSR is a flat color patch of average R, G, and B values within a defined spot region. During a Match, the system calculates the average R, G, and B values within a spot region selected by the user and compares it with the reference value. The system then adjusts only one of gain, gamma, or black to make the current spot value match the reference value. The size, shape, and location of the region of interest can be adjusted dynamically on any of the incoming images.

The primary parameters stored in the data structure are the lower edge (Low), the upper edge (High), and the peak value (Peak), for each of the red, green, and blue histograms, which correspond respectively to BLACK, GAIN, and GAMMA parameters. Also, there are stored parameters for medium center, low center, and high center for each of the red, green, and blue (e.g. Medium Red Center, Low Green Center, High Blue Center, etc.). The medium center, low center, and high center parameters are other characteristics of the histogram. They correspond to the center of mass (called the center of gravity in physics) within a predetermined region. The general formula for center of mass is:

$$\text{center of mass} = \frac{\sum_x (x \cdot f(x))}{\sum_x f(x)}$$

where for a histogram x is gray level and f(x) is the frequency of the gray level x.

Medium center is the center of mass for the total histogram, where x ranges from 0 to 255, and thus represents the center of mass of the overall distribution.

Low center is the center of mass in the lower three quarters of a histogram, where x ranges from 0 to 192. It will be appreciated that the black control has the most influence on this parameter.

High center is the center of mass in the upper three quarters of a histogram, where x ranges from 64 to 255. It will be appreciated that gain has the most influence on this parameter.

Other characteristics or parameters of color distributions could also be applied to classify a pattern and then to distinguish differences between a source image and a reference. Such characteristics include the rising and falling edges of a histogram, maximum values of different groups (i.e. peaks) in a histogram, the width of each group (peak) in a histogram, the number of counts of each group (peak) in a histogram, the center of a group of points in vector scope (hue-saturation distribution), etc. Yet other characteristics or parameters will occur to those skilled in the art.

The Image data field stores the iconized representation or VSR of the reference image. It should be noted that in the preferred embodiment, the histogram of the reference image is computed during the setup procedure. Its high, low, and peak values and other characteristics are calculated and stored.

From the foregoing description of the preferred embodiment of the present invention, it will be appreciated that the present invention is a solution to the problem of automating the process of adjusting signals from an image source to "coarse tune" the settings of the image source prior to further color correction by a color operator. It meets the objects of the invention as recited above and provides a practical system for automating what has heretofore been a tedious adjustment process. Thus, the present invention provides a system in which a color correction system operator can more efficiently set the color correction system to a beginning setting from which further corrections can be made utilizing known color correction equipment in the known manner.

The invention obviates the repetitive and tedious steps of observing a vectorscope or waveform monitor and repeatedly adjusting video parameter controls.

It will be further appreciated that the examples provided herein are illustrative only and that the described examples of GAIN, GAMMA, and BLACK can be extended to other video parameters such as hue, saturation, or luminance, and that other measures of color distribution such as center of mass, mean values, sigma, regression analysis, and other pattern matching algorithms or methods may also be used.

In view of the foregoing description of the preferred embodiment of the present invention, other embodiments will suggest themselves to those skilled in the art. Therefore, the scope of the present invention is to be limited only by the claims below.

What is claimed is:

1. A method for automatically processing color image signals, comprising the computer-implemented steps of:
    storing predetermined color parameter statistical data for a plurality of selectable reference images in a reference image memory device;
    receiving an operator selection of a particular one of the selectable reference images;
    retrieving the predetermined color parameter statistical data associated with the selected reference image from the reference image memory device;
    receiving signals associated with a source image from an image source;
    capturing the source image signals with a capture device in a source image memory device;
    determining color parameter statistical data associated with the captured source image; and
    modifying the source image signals to provide corrected source image signals that have color parameter statistical data that match the predetermined color parameter statistical data of the selected reference image.

2. The method of claim 1, wherein the step of modifying comprises:
    comparing the predetermined color parameter statistical data of the selected reference image with the determined color parameter statistical data of the source image; and
    in response to the comparison step indicating a difference between the predetermined color parameter statistical data of the selected reference image and the determined color parameter statistical data of the source image, providing a control signal output to a utilization device.

3. The method of claim 1, wherein the color image signals are color video signals.

4. The method of claim 1, wherein the source image is provided by equipment selected from the group: a telecine, a television camera, video tape playback equipment, video signal digitizer, a digital video signal providing device, a graphics generating device.

5. The method of claim 1, wherein the predetermined color parameter statistical data comprises the highest value, the lowest value, and the peak value of an image signal.

6. The method of claim 5, wherein the predetermined color parameter statistical data is stored for each of the red, green, and blue video channels.

7. The method of claim 5, wherein the predetermined color parameter statistical data is stored for the parameters of hue, saturation, and luminance.

8. The method of claim 1, wherein the step of determining color parameter statistical data associated with the captured source image comprises determining the highest value, the lowest value, and the peak value of the color parameter having the greatest number of occurrences.

9. The method of claim 1, further comprising the step of displaying a histogram associated with the captured source image after the step of determining color parameter statistical data associated with the captured source image.

10. The method of claim 9, further comprising the step of displaying data corresponding to the determined statistical parameter of the source image on a workstation display monitor.

11. The method of claim 1, wherein the method is carried out in a computer based workstation including a workstation display monitor.

12. The method of claim 11, further comprising the step of displaying, on the workstation display monitor, a plurality of selectable icons representing the plurality of selectable reference images.

13. The method of claim 12, wherein the step of receiving an operator selection of a particular one of the selectable reference images comprises indication by the operator on a particular one of the plurality of selectable icons with an input device.

14. The method of claim 1, wherein the utilization device is selected from the group: an image processing system, a color corrector, a parameter controllable image source, an image destination device.

15. The method of claim 2, further comprising the steps of:
    utilizing the control signal output at the utilization device to adjust a color parameter;
    repeating the steps of receiving signals, capturing the source image, determining the color parameter statistical data associated with the captured source image, comparing the predetermined color parameter statistical data associated with the selected reference image with the determined color parameter statistical data of the source image, and providing the control signal output until the difference between the predetermined color parameter statistical data of the selected reference image and the determined color parameter statistical data of the source image is less than a predetermined amount,
    whereby the signals associated with the source image are automatically adjusted.

16. A method for automatically processing image signals, comprising the computer-implemented steps of:
    storing predetermined color parameter statistical data for a plurality of selectable reference images in a reference image memory device;
    receiving signals associated with a source image from an image source;
    capturing the source image signals with a capture device;
    digitizing the captured source image signals;
    storing the digitized captured source image signals in a source image memory device;
    determining color parameter statistical data associated with the source image;
    displaying data corresponding to the determined statistical parameter of the source image;
    displaying a plurality of selectable icons representing the plurality of selectable reference images;
    receiving an operator selection of one of the selectable reference images by indication on a particular one of the plurality of selectable icons with an input device;
    retrieving the predetermined color parameter statistical data associated with the selected reference image from the reference image memory device;

comparing the predetermined color parameter statistical data of the selected reference image with the determined color parameter statistical data of the source image;

in response to the comparison step indicating a difference between the predetermined color parameter statistical data of the selected reference image and the determined color parameter statistical data of the source image, providing a control signal output to a utilization device;

utilizing the control signal output at the utilization device to adjust a parameter at the image source;

repeating the steps of capturing the source image, determining the color parameter statistical data of the source image, comparing the predetermined color parameter statistical data associated with the selected reference image with the determined color parameter statistical data of the source image, and providing a control signal output until the difference between the predetermined color parameter statistical data of the selected reference image and the determined color parameter statistical data of the source image is less than a predetermined amount, whereby the signals associated with the source image are automatically adjusted at the image source.

17. In a color correction system including an image source, an image processing system coupled to the image source for imparting color corrections to signals provided by the image source, and a computer based workstation for controlling the image processing system, a method for automated color correction, comprising the steps of:

storing predetermined color parameter statistical data for a plurality of selectable reference images in a reference image memory device;

receiving an operator selection of a particular one of the selectable reference images;

retrieving the predetermined color parameter statistical data associated with the selected reference image from the reference image memory device;

receiving signals associated with a source image from the image source;

capturing the source image signals with a capture device in a source image memory device;

determining color parameter statistical data associated with the captured source image;

comparing the predetermined color parameter statistical data of the selected reference image with the determined color parameter statistical data of the source image;

in response to the comparison step indicating a difference between the predetermined color parameter statistical data of the selected reference image and the determined color parameter statistical data of the source image, providing a control signal output to the image processing system.

18. The method of claim 17, wherein the source image is provided by equipment selected from the group: a telecine, a television camera, video tape playback equipment, video signal digitizer, a digital video signal providing device, a graphic image gererating device.

19. The method of claim 17, wherein the predetermined color parameter statistical data comprises the highest value, the lowest value, and the peak value of an image signal.

20. The method of claim 19, wherein the predetermined color parameter statistical data is stored for each of the red, green, and blue video channels.

21. The method of claim 19, wherein the predetermined color parameter statistical data is stored for the parameters of hue, saturation, and luminance.

22. The method of claim 17, wherein the step of determining color parameter statistical data associated with the captured source image comprises determining the highest value, the lowest value, and the peak value of the color parameter having the greatest number of occurrences.

23. The method of claim 17, further comprising the step of displaying a histogram associated with the captured source image after the step of determining color parameter statistical data associated with the captured source image.

24. The method of claim 23, further comprising the step of displaying data corresponding to the determined statistical parameter of the source image on a workstation display monitor.

25. The method of claim 17, further comprising the step of displaying a plurality of selectable icons representing the plurality of selectable reference images.

26. The method of claim 25, wherein the step of receiving an operator selection of a particular one of the selectable reference images comprises indication by the operator on a particular one of the plurality of selectable icons with an input device.

27. The method of claim 17, further comprising the steps of:

utilizing the control signal output at the image processing system to adjust a color parameter;

repeating the steps of receiving signals, capturing the source image, determining the video parameter statistical data associated with the captured source image, comparing the predetermined color parameter statistical data associated with the selected reference image with the determined color parameter statistical data of the source image, and providing the control signal output until the difference between the predetermined color parameter statistical data of the selected reference image and the determined color parameter statistical data of the source image is less than a predetermined amount, whereby the signals associated with the source image are automatically adjusted by the image processing system.

28. A system for the automated correction of image signals, comprising:

a computer based workstation including a memory, a workstation display monitor, a data input port, a data output port, and an operator input device;

an image source device for providing image signals;

an image processing system for imparting color corrections to an input signal received from said image source device and providing a color corrected output signal;

a utilization device coupled to said image processing system;

the workstation being operative to:
store predetermined color parameter statistical data for a plurality of selectable reference images in the memory;

display a window on the display monitor including a plurality of selectable icons associated with the plurality of selectable reference images;

receive an operator selection of a particular one of the selectable reference images with the operator input device;

retrieve the predetermined color parameter statistical data associated with the selected reference image from the memory;

receive signals associated with a source image from the image source device at the data input port;

capture the source image signals in the memory;

determine color parameter statistical data associated with the captured source image;

compare the predetermined color parameter statistical data of the selected reference image with the determined color parameter statistical data of the source image;

in response to the comparison step indicating a difference between the predetermined color parameter statistical data of the selected reference image and the determined color parameter statistical data of the source image, provide a control signal output to the utilization device on the data output port.

29. The system of claim 28, wherein each of the selectable icons comprises a visual scene representation (VSR) of an image for which predetermined video parameter statistical data is available.

30. The system of claim 28, wherein the workstation is operative to obtain a visual scene representation (VSR) of a source image provided by the source image device, and further operative, during the determination of color parameter statistical data associated with the captured source image, to display a window on the display monitor including said VSR and a histogram corresponding to the color parameter statistical data.

31. The system of claim 28, wherein the workstation is further operative to display selection controls for a selectable color control parameter.

32. The system of claim 31, wherein the selectable color control parameter is selected from the group: gain, gamma, black.

33. The system of claim 28, further comprising a signal switching device for switching the workstation data input port between the image source device and the image processing system.

34. The system of claim 28, further comprising a target image display for displaying images.

35. The system of claim 34, wherein the target image display is a second display monitor.

36. The system of claim 34, wherein the workstation is further operative to display a spot size control for controlling selection of a predetermined region on the target image display; and utilize the predetermined region on the target image display to determine the source image signals.

37. The system of claim 36, wherein the size and location of the predetermined region are dynamically adjustable during the step of obtaining a reference image as well as during the workstation operations for comparing and providing a control signal output.

38. The system of claim 34, wherein the workstation is further operative to:

display a first control screen on the workstation display monitor comprising a plurality of selectable visual scene representation (VSR) icons, each selectable VSR icon representing one of a plurality of selectable reference images for which predetermined color parameter statistical data is available;

in response to first user command, display a second control screen on the workstation display monitor including a visual scene representation (VSR) region;

in response to a second user command, capture a visual scene representation of the image displayed on the target image display and displaying the visual scene representation in the VSR region of the second control screen;

in response to a third user command, determine color parameter statistical data associated with the image represented by the captured VSR;

store the captured VSR and its associated color parameter statistical data in said memory as said predetermined color parameter statistical data; and display the captured VSR on said first control screen as one of the plurality of selectable VSR icons.

39. A method for the automated correction of color image signal parameters, the method being carried out on a computer based workstation coupled to an image source that provides source image signals, comprising the steps of:

displaying a first control screen on a display monitor comprising a plurality of selectable icons, each selectable icon representing one of a plurality of selectable reference images;

storing color parameter statistical data associated with each of the selectable reference images;

displaying a match control on the first control screen; and in response to operator actuation of the match control, capturing the source image signals with a capture device in a source image memory device, determining color parameter statistical data associated with the captured source image, comparing the predetermined color parameter statistical data of the selected reference image with the determined color parameter statistical data of the source image, in response to the comparison step indicating a difference between the predetermined color parameter statistical data of the reference image and the determined color parameter statistical data of the source image, providing a control signal output to a utilization device, utilizing the control signal output at the utilization device to control a color parameter of the image source as the source image signals are provided; and repeating the steps of capturing, determining, comparing, and providing a control signal output until a predetermined terminating event.

40. The method of claim 39, further comprising the step of displaying selection controls for a selectable color control parameter.

41. The method of claim 40, wherein the selectable color control parameter is selected from the group: gain, gamma, black.

42. The method of claim 39, further comprising the step of displaying the image produced by the image source on a target image display for viewing by an operator;

displaying a spot size control for controlling selection of a predetermined region on the target image display;

utilizing the predetermined region on the target image display to determine the source image signals.

43. The method of claim 39, wherein the terminating event comprises completion of a predetermined number of iterations of the steps of capturing, determining, comparing, and providing a control signal output.

44. The method of claim 39, wherein the terminating event comprises determination that the difference between the predetermined color parameter statistical data of the reference image and the determined color parameter statistical data of the source image is less than a predetermined amount.

45. The method of claim 39, further comprising the step of utilizing the control signal output to control a color parameter of the image source as the source image signals are provided.

46. The method of claim 39, further comprising the step of utilizing the control signal output at color correction equipment to control a parameter of the source image.

47. The method of claim 39, further comprising the step of displaying the source image on a target image display.

48. The method of claim 47, wherein the workstation includes means for selecting between signals provided by the image source and signals provided by the color correction equipment, and further comprising the step of selecting the image source or the color correction equipment to display signals being corrected.

49. The method of claim 39, wherein the workstation is coupled to an image processing system operative to impart color corrections to input signals provided by the image source, and wherein the workstation includes color correction software for controlling the image processing system.

50. In a video signal color correction system, a method for capturing reference information associated with an image produced by an image source, comprising the steps of:

displaying an image produced by the image source on a display monitor;

displaying a first control screen on the display monitor comprising a plurality of selectable visual scene representation (VSR) icons, each selectable VSR icon representing one of a plurality of selectable reference images for which captured reference information is available;

in response to first user command, displaying a second control screen on the display monitor including a visual scene representation (VSR) region;

in response to a second user command, capturing a visual scene representation of the image displayed on the display monitor and displaying the visual scene representation in the VSR region of the second control screen;

in response to a third user command, determining color parameter statistical data associated with the image represented by the captured VSR;

storing the captured VSR and its associated color parameter statistical data in a memory device as said reference information; and displaying the captured VSR on the first control screen as one of the plurality of selectable VSR icons, wherein the image produced by the image source is displayed on a target image display monitor. and the first and second control scenes are displayed on a separate display monitor.

51. The method of claim 50, further comprising the step of storing color parameter statistical data associated with each of the selectable reference images in the memory device for use by the color correction equipment.

52. The method of claim 50, wherein the user commands are provided by an operator input device;

the first user command is a set command;

the second user command is a capture command; and the third user command is an initialize command.

53. The method of claim 50, in further response to the third user command, displaying a graphical representation of the color parameter statistical data on a third control screen on the display monitor.

54. In a video signal color correction system, a method for capturing reference information associated with an image produced by an image source, comprising the steps of:

displaying an image produced by the image source on a display monitor;

displaying a first control screen on the display monitor comprising a plurality of selectable visual scene representation (VSR) icons, each selectable VSR icon representing one of a plurality of selectable reference images for which captured reference information is available;

in response to first user command, displaying a second control screen on the display monitor including a visual scene representation (VSR) region;

in response to a second user command, capturing a visual scene representation of the image displayed on the display monitor and displaying the visual scene representation in the VSR region of the second control screen;

in response to a third user command, determining color parameter statistical data associated with the image represented by the captured VSR;

in further response to the third user command, displaying a graphical representation of the color parameter statistical data on a third control screen on the display monitor;

storing the captured VSR and its associated color parameter statistical data in a memory device as said reference information; and displaying the captured VSR on the first control screen as one of the plurality of selectable VSR icons.

* * * * *